March 6, 1934. J. GOULDBOURN ET AL 1,949,539
LASTING MACHINE
Filed July 11, 1932 9 Sheets-Sheet 1

INVENTORS.
Joseph Gouldbourn
Fred Ricks
William T. B. Roberts
By their Attorney
Victor Coll.

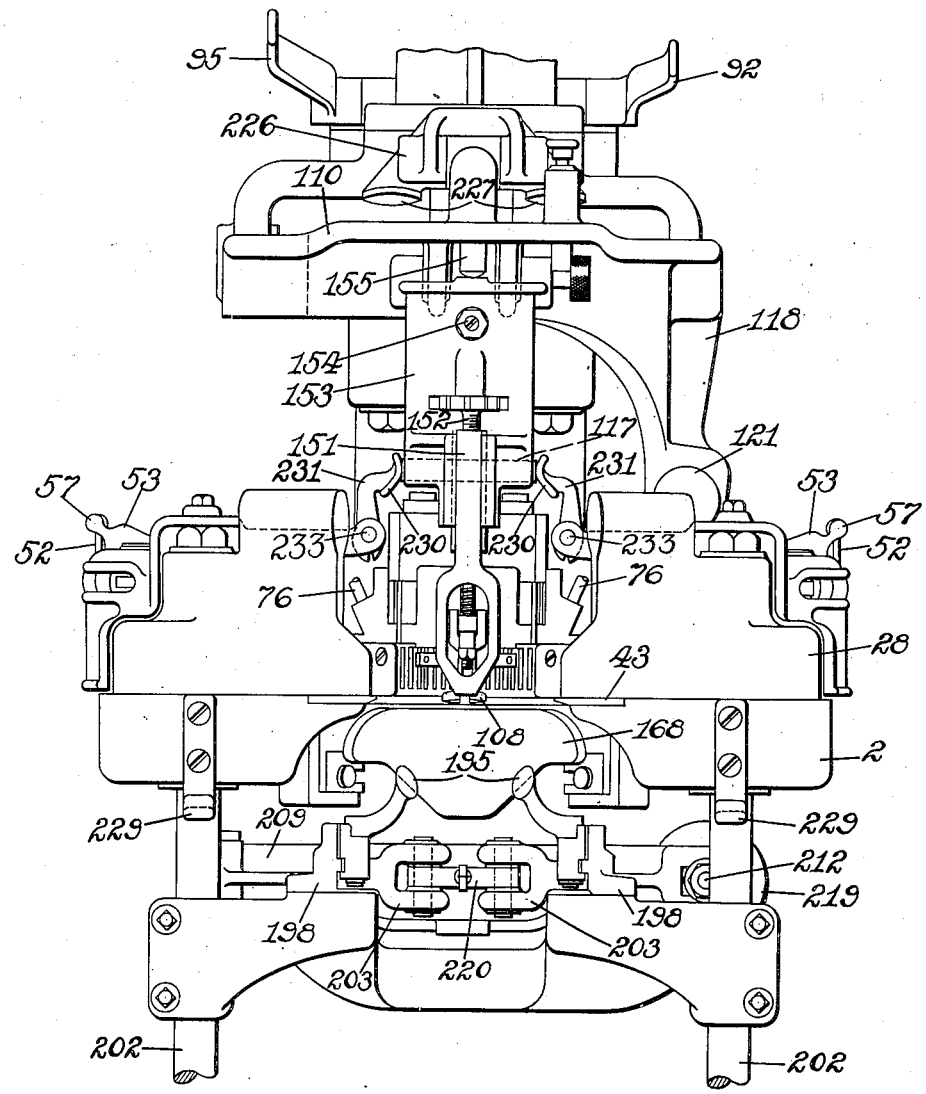

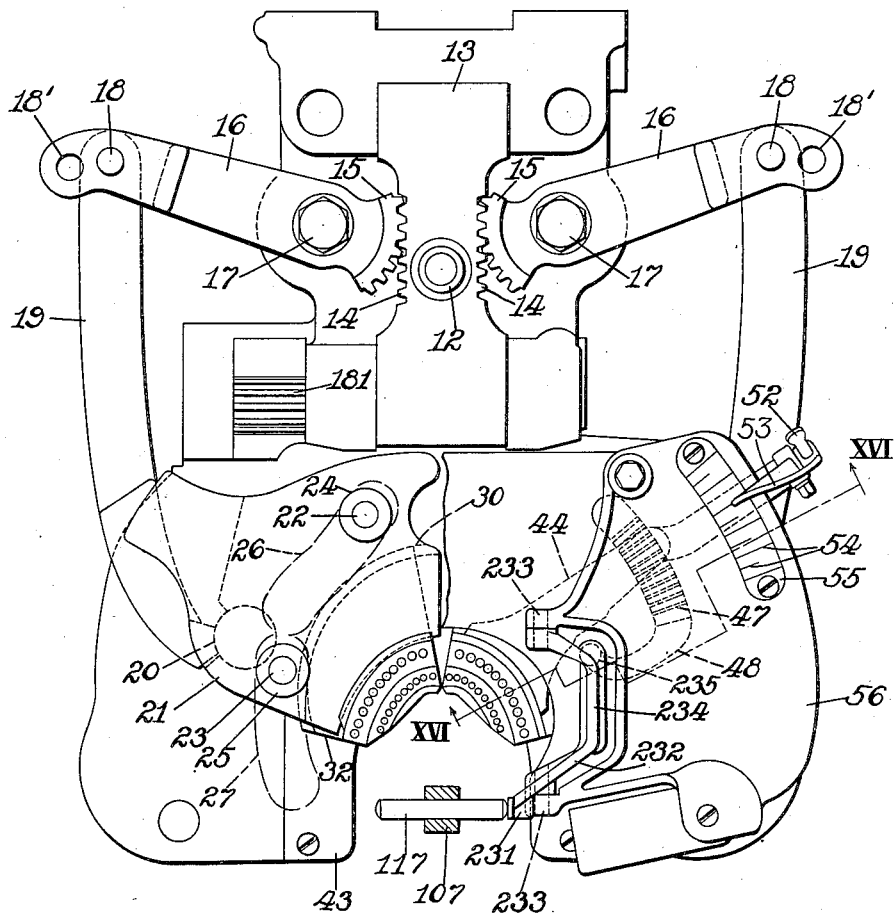

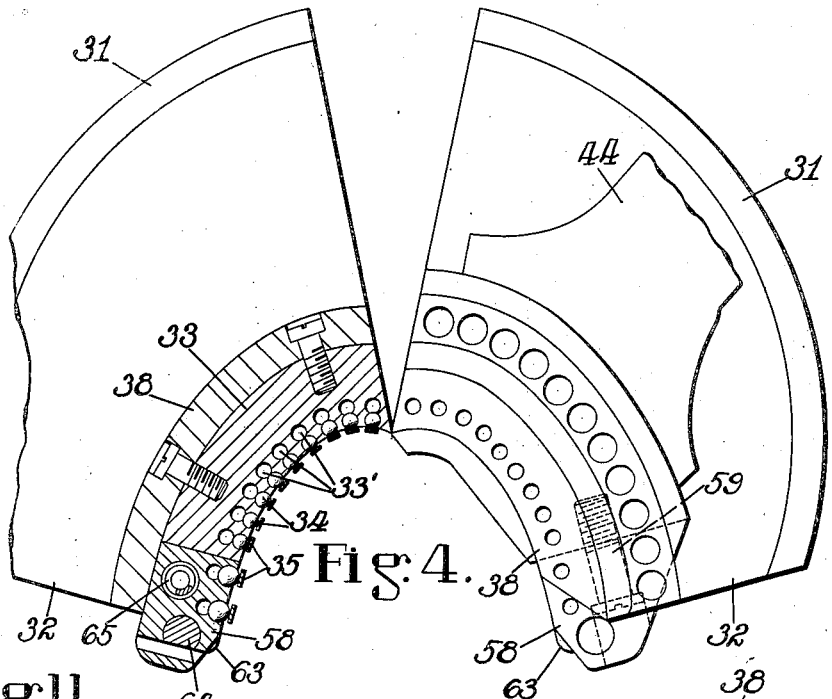
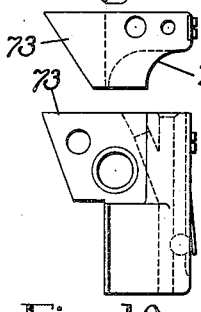
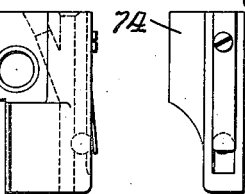
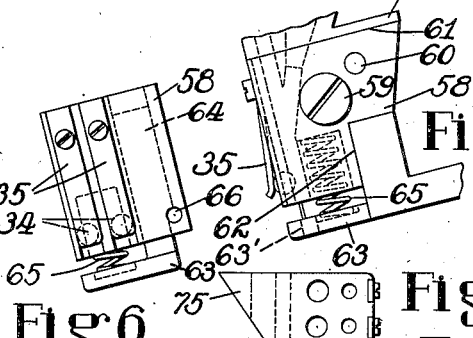
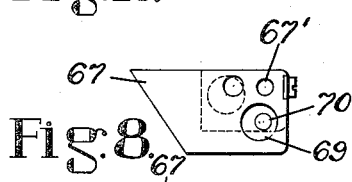
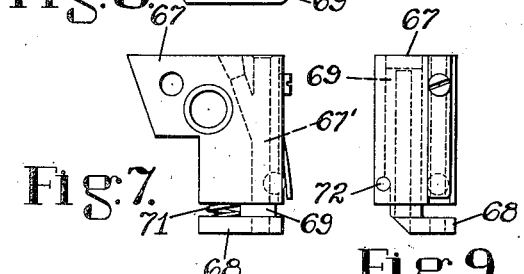
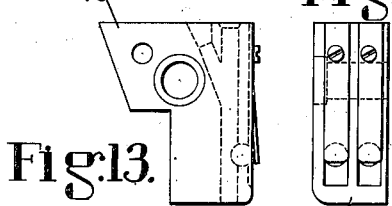

March 6, 1934.  J. GOULDBOURN ET AL  1,949,539
LASTING MACHINE
Filed July 11, 1932   9 Sheets-Sheet 5
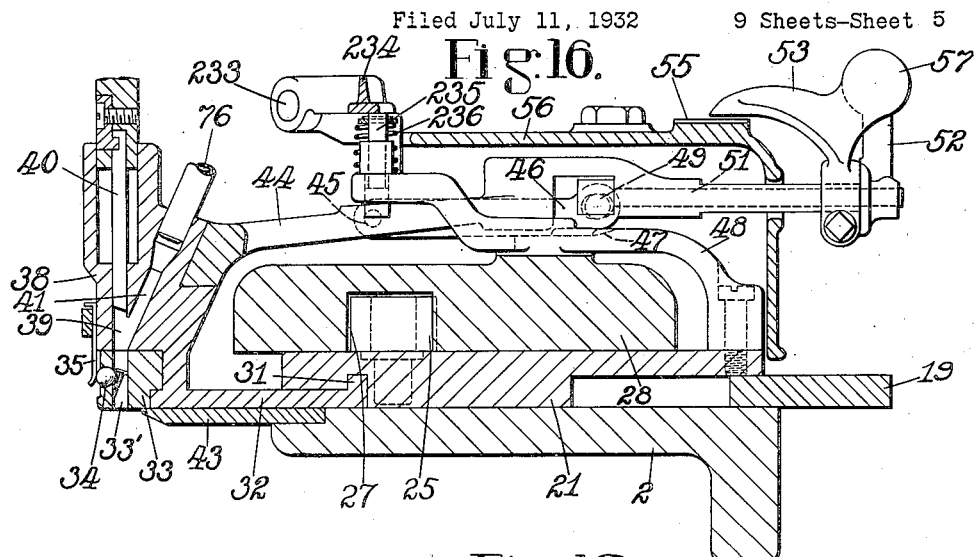
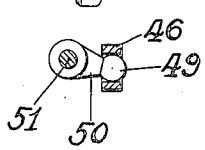
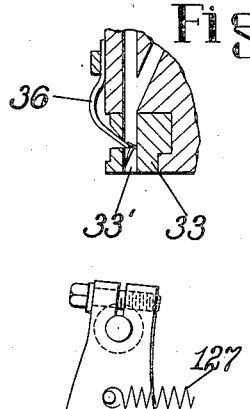
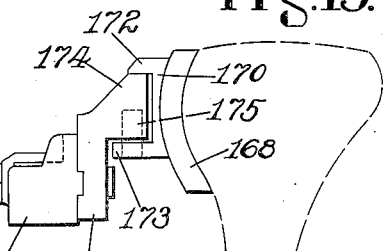
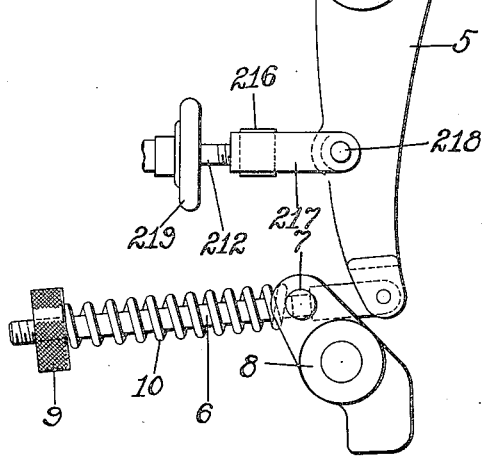
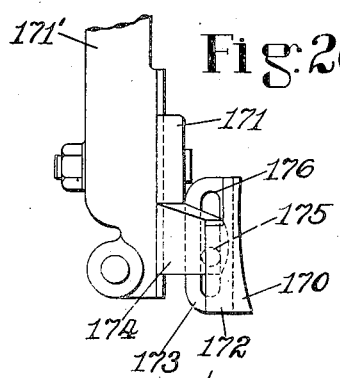
INVENTORS
Joseph Gouldbourn
Fred Ricks
William T. B. Roberts
By their Attorney
Victor Cobb

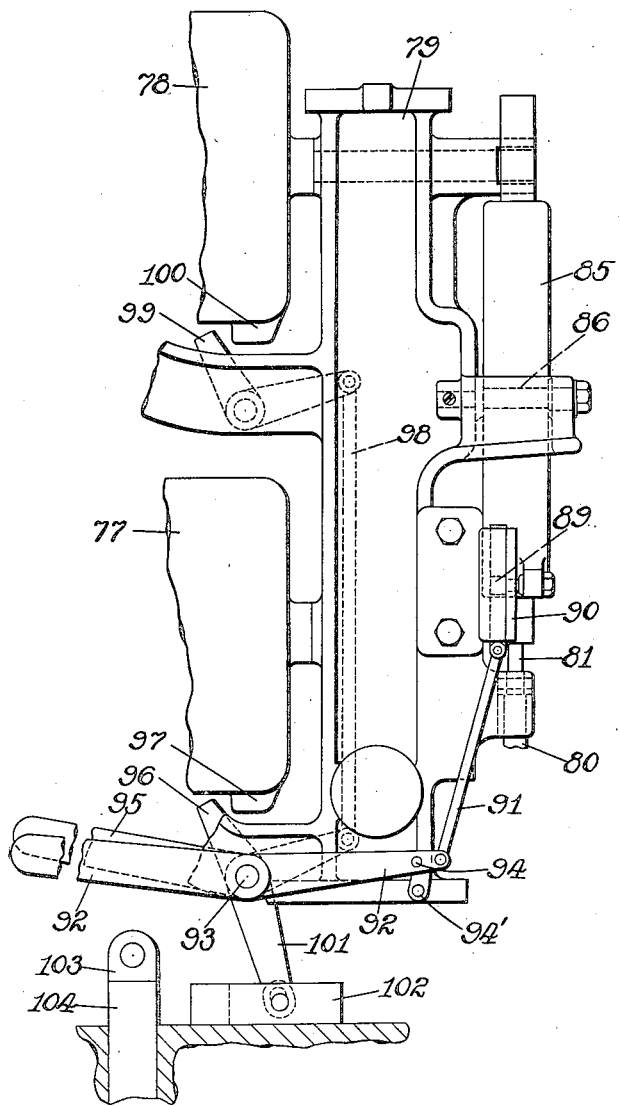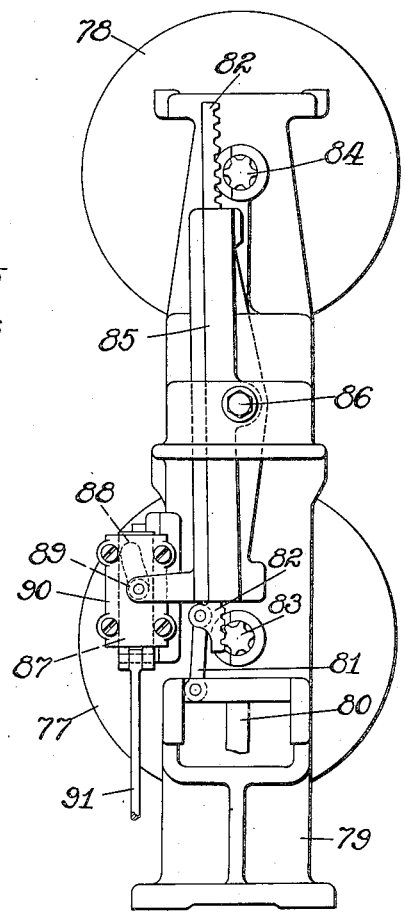

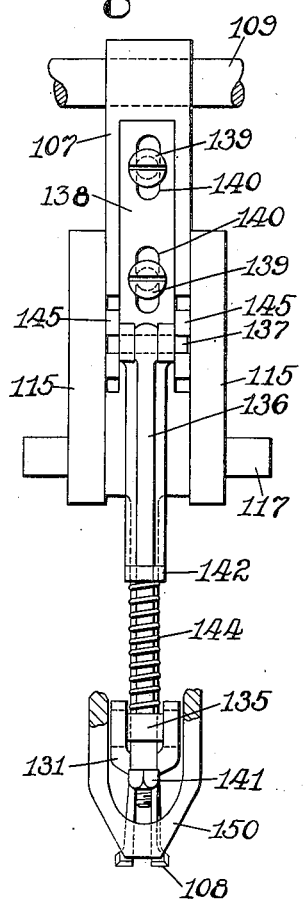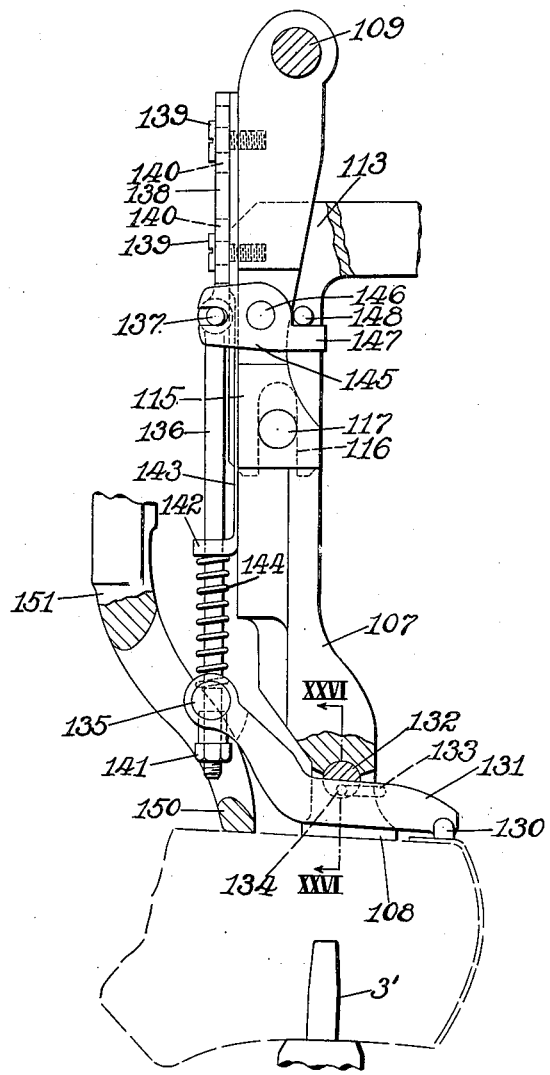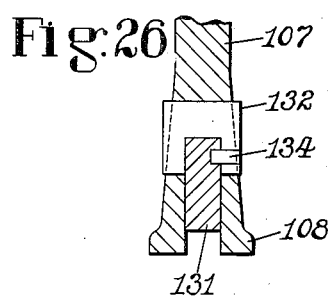

March 6, 1934.  J. GOULDBOURN ET AL  1,949,539

LASTING MACHINE

Filed July 11, 1932   9 Sheets-Sheet 8

March 6, 1934.  J. GOULDBOURN ET AL  1,949,539
LASTING MACHINE
Filed July 11, 1932  9 Sheets-Sheet 9

INVENTORS
Joseph Gouldbourn
Fred Ricks
William T. B. Roberts
By their Attorney
Victor Cobb Patented Mar. 6, 1934

1,949,539

UNITED STATES PATENT OFFICE

1,949,539

LASTING MACHINE

Joseph Gouldbourn, Fred Ricks, and William Thomas Buckingham Roberts, Leicester, England, assignors to United Shoe Machinery Corporation, Paterson, N. J., a corporation of New Jersey Application July 11, 1932, Serial No. 621,856. In Great Britain July 27, 1931

79 Claims. (Cl. 12—4)

This invention relates to lasting machines and in some of its aspects more particularly to machines for lasting the heel ends of shoes. The invention is herein illustrated as embodied in a machine of the same general type as that disclosed in Letters Patent No. 1,583,044, granted on May 4, 1926 upon an application of C. H. Hoyt, but including upper-fastening mechanism of the general character disclosed in Letters Patent No. 1,852,015, granted on April 5, 1932 upon an application of J. C. Jorgensen. It is to be understood, however, that the invention is not limited to machine organizations of that particular type or character and that as to some features also it is not limited to heel-end lasting machines.

In one aspect the invention relates more particularly to the control and operation of end-lasting wipers. It has been proposed heretofore to operate end-lasting wipers in such manner that the final portion of the wiping operation, after advancing movement of the wipers lengthwise of the shoe and closing movements laterally of the shoe, is effected by further closing movements of the wipers without any substantial further advancing movement, so as to avoid any undue displacement of portions of the margin of the upper lengthwise of the shoe, as disclosed, for example, in Letters Patent No. 1,880,212, granted on October 4, 1932 upon an application of Fred Ricks. The present invention, in accordance with one feature, provides novel means for controlling the wipers in such manner as to accomplish that result, the means disclosed being simple in construction and of such a character as to minimize friction of the operating parts in the wiping operation. As illustrated, the different wipers have associated with them guiding devices formed and arranged to determine such paths for the wipers that in their operation they receive movements of the character above described, the guiding devices in the construction shown comprising cam grooves formed in a stationary portion of the machine and rolls mounted on movable wiper carriers and cooperating with the cam grooves to guide the wipers.

Further novel features relating to the wiper mechanism are to be recognized in provision for adjustments to adapt the mechanism better for operation upon shoes of different sizes, the construction shown comprising novel means whereby the distances through which the wipers move in their operation may be varied, together with means whereby the wipers also may be preliminarily adjusted relatively to the parts that operate them. As illustrated, provision is thus afforded for varying the amount of the closing movements that the wipers receive after their advancing movement has substantially ceased, the construction shown comprising means for varying the effective lengths of levers through which movements are imparted separately to the different wipers.

In the operation of heel-end lasting machines it is important that each shoe and last be accurately positioned in such relation to the wipers that the latter will be effective to wipe the upper inwardly all around the heel seat with adequate pressure but without danger of damaging the upper in any location. To this end, the invention further provides novel work-positioning means, the means herein shown comprising a plurality of members arranged in a novel relation to one another for engaging the bottom of the shoe in different locations to determine the position of the heel end of the shoe relatively to the plane of the wipers. More particularly, as illustrated, there is provided a holddown member for engaging the bottom of the heel end of the shoe, together with other members arranged to engage the shoe bottom in locations forwardly and rearwardly of the holddown, these members being adjustable relatively to the holddown. In one form of construction disclosed a member at the rear of the holddown is arranged to engage the margin of the upper on the shoe bottom and is movable inwardly over the shoe bottom by the action of the wipers thereon; whereas an alternative construction comprises an upper-engaging member arranged to project forwardly over the shoe bottom between the wipers and movable only in directions heightwise of the shoe. For engaging the shoe bottom forwardly of the holddown there is provided, in one form disclosed, a member the shoe-engaging portion of which is substantially midway between the opposite sides of the shoe bottom, and, in another form, members arranged to engage the margin of the upper on the shoe bottom at the opposite sides thereof in locations farther forwardly than the wipers extend in the lasting operation.

To assist in supporting and holding the shoe against tipping movements in the lasting operation, the invention further provides novel means for clamping the shoe at its opposite sides, the construction shown comprising members arranged for clamping engagement with the shoe forwardly of but near the usual heel band in locations spaced substantial distances from the shoe bottom so as to act on portions of the sides of the shoe that curve inwardly toward the top thereof. The invention also provides novel means for operating the clamping members and for controlling them in such manner as to present them initially in predetermined positions while permitting them to adjust themselves to the shoe regardless of the shape or lateral position of the portions of the shoe which they engage.

In accordance with the further feature, the machine herein shown is provided with novel means, comprising a part of the shoe-controlling mechanism, for decreasing the resistance of the shoe to the movement of the wipers in case the wipers encounter an abnormal amount of resistance such as to prevent the machine from completing its cycle. In the construction shown, in general similarity to prior machines of the same general type, the shoe is clamped and controlled through the action of a cam-operated lever having a cam-engaged roll thereon, and for the purpose in view there is provided novel means whereby the roll may be displaced relatively to the lever to decrease the force with which the shoe is held.

The above and other features of the invention, including also novel means for controlling the heel band, novel means for operating alternatively different tack-supplying mechanisms, and novel means whereby the shoe may be supported for manual operations before it is presented in lasting position, will now be more particularly described by reference to the accompanying drawings and pointed out in the claims.

In the drawings,

Fig. 2 is a view in front elevation of the portion of the machine shown in Fig. 1;

Fig. 3 is a plan view of portions of the wiper mechanism and parts associated therewith;

Fig. 4 is a plan view on an enlarged scale, with parts in section, showing the wipers and portions of the tacking mechanism associated therewith;

Figs. 5 and 6 show, in front and side elevation respectively, a detachable end piece, shown in plan in Fig. 4, of the wiping and tacking mechanism, this end piece having a yielding work-engaging portion and being constructed for the driving of two tacks through this portion;

Figs. 7, 8 and 9 are respectively front, plan and side views of a detachable end piece similar to that of Figs. 5 and 6, but having a yielding work-engaging portion constructed for the driving of only one tack through it;

Figs. 10, 11 and 12 are respectively front, plan and side views of still another form of detachable end piece constructed for the driving of only one tack and having a solid instead of a yielding work-engaging portion;

Figs. 13, 14 and 15 are respectively front, plan and side views of a detachable end piece similar to that shown in Figs. 10, 11 and 12, but constructed for the driving of two tacks;

Fig. 16 is a part sectional view on the line XVI—XVI of Fig. 3, on a somewhat enlarged scale;

Fig. 17 is a detail view of certain parts shown in Fig. 16;

Fig. 18 shows in vertical section a portion of the wiping and tacking mechanism including different means than that shown in other figures for retaining the tack in the tack pocket;

Fig. 19 shows in front elevation a portion of the heel band and its supporting mechanism with which the machine is provided;

Fig. 20 is a plan view of parts shown in Fig. 19;

Fig. 21 shows in side elevation a portion of the mechanism provided for swinging the jack to force the shoe yieldingly into the heel band and for also operating devices for supporting the last and shoe at the sides thereof against longitudinal and lateral tipping movements;

Fig. 22 is a view mainly in right-hand side elevation showing mechanism provided for controlling the tack-supplying means;

Fig. 23 is a view in rear elevation of a portion of the mechanism shown in Fig. 22;

Fig. 24 is a view partly in right-hand side elevation and partly in section, showing shoe-positioning means with which the machine is provided;

Fig. 25 is a view in front elevation, with parts broken away, of the structure shown in Fig. 24;

Fig. 26 is a section, on an enlarged scale, on the line XXVI—XXVI of Fig. 24;

Figure 1:
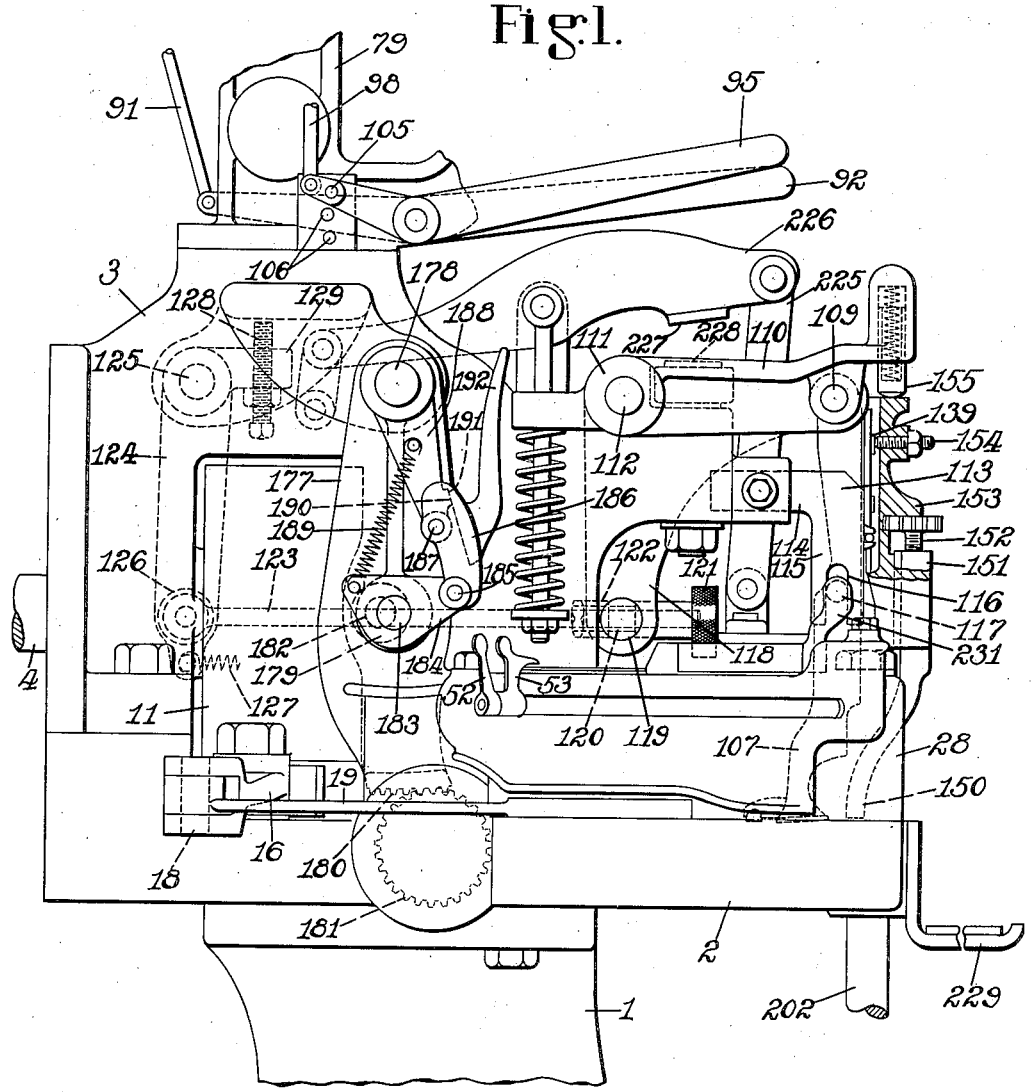
Fig. 1 is a view in side elevation, with parts in section, showing the main upper portion of a machine in which the invention is embodied.

Similarly to the machines disclosed in the previously mentioned Letters Patent, the machine herein shown includes a column 1 (Fig. 1) supported on a base upon which may be mounted an electric motor for driving the machine. On the upper end of the column 1 there is secured a plate-like member 2 on which is fixed a head casting 3 having bearings for a horizontal rearwardly extending cam shaft 4 which is power-operated and is controlled through a clutch substantially as disclosed in Letters Patent No. 1,583,044. For supporting the shoe and last there is provided a jack, not shown in detail but including the usual heel spindle 3' (Fig. 24), the jack being mounted for forward and rearward swinging movements about an axis at its lower end as in prior machines of the illustrated type. The jack is preferably controlled by a treadle (not shown) by which the operator may raise it, after swinging it rearwardly to carry the shoe into the heel band, to bring the heel seat face of the shoe into contact with shoe-positioning means hereinafter described. Preferably also the construction is such that the shoe on the jack is unsupported at its forepart, the heel spindle being so mounted as to permit lateral and lengthwise tipping movements of the shoe and last so that the heel-seat face of each shoe may be properly positioned in relation to the plane of the wipers.

The machine is further provided with mechanism of the same general character as disclosed in Letters Patent No. 1,583,044 for swinging the jack farther rearwardly to press the shoe yieldingly against the heel band after the jack has been swung rearwardly and raised by the operator as above described, this mechanism including a lever 5 (Fig. 21) operated by a cam on the cam shaft. In the construction herein shown the lower end of the lever 5 is forked and is pivotally connected to the rear end of a forwardly extending rod 6. The rod 6 extends through a pin 7 mounted in the upper arm of a pawl carrier 8 which is similar to the pawl carrier forming part of the corresponding mechanism disclosed in the above-mentioned Letters Patent and through the operation of which rearward swinging movement is imparted to the jack. The rod 6 has adjustably threaded on its front end a hand nut 9, and between this nut and the pin 7 there is a compression spring 10 which is mounted on the rod 6 and serves to transmit force yieldingly from the lever 5 to the pawl carrier 8. The connections between the pawl carrier and the jack are substantially like those described in the above-mentioned Letters Patent, and similarly also to the prior disclosure the machine is provided with mechanism (not shown in detail) for operating the jack positively to press the heel end of the shoe more firmly into the heel band after it has been operated yieldingly through the parts described, as well as for closing the heel band and for pressing the shoe yieldingly up against the shoe-positioning means in the power operation of the machine.

In the construction herein shown the wipers, hereinafter more particularly described, are operated positively by a path cam (not shown) formed in the periphery of a cam wheel 11 (Fig. 1) on the cam shaft 4, this cam engaging a roll 12 (Fig. 3) carried by a horizontal slide 13 mounted in a guideway in the member 2 for forward and rearward movements. The slide 13 is provided on each side thereof with rack teeth 14 in engagement with gear segments 15 formed on the inner arms of horizontal levers 16 which are pivoted on vertical studs 17 on the member 2 at the opposite sides of the slide. The outer arms of the levers 16 are pivotally connected by studs 18 to the rear ends of forwardly extending links 19. The front ends of these links have rounded ends 20 swiveled in correspondingly curved recesses in wiper-carrying plates 21 supported on the member 2, and each of the plates 21 has extending upwardly from it a pair of studs 22, 23 on which are mounted rolls 24, 25. These rolls lie respectively in cam grooves 26, 27 formed in the lower side of a cover plate 28 (Fig. 16) fixed on the member 2, the cam grooves being shaped to give the desired movements to the wiper-carrying plates 21 in response to the movements of the slide 13. The character of the movements of the wipers thus determined by the guiding cam grooves 26, 27 is illustrated diagrammatically in Fig. 29, where the starting position of the inner wiping edge of one of the wipers is indicated by the line A—A'. There is first imparted to the wipers a bodily advancing movement lengthwise of the shoe accompanied by closing movements laterally of the shoe to bring the wiping edges substantially into engagement with the upper around the back and sides of the heel end of the shoe prior to any substantial overwiping movement of any portion of the wipers over the heel seat, as indicated by the line B—C. The advancing and closing movements are then continued to bring the edges of the wipers to the position represented by the line D—E. Thereafter the wipers receive closing movements only, about an axis at the point D, to bring their wiping edges to the position indicated by the line D—F, thus completing the wiping operation without any further bodily advance of the wipers lengthwise of the shoe, so as to avoid any undue forward displacement of portions of the margin of the upper at the sides of the heel seat. The cam that operates the slide 13 is preferably so formed as to cause the wipers to wipe over the shoe bottom twice in each cycle of the machine, the wipers after their first inward wiping movement being retracted to carry their edges from the line D—F substantially to the line B—C and the wipers then being operated as described to carry their edges again to the line D—F. At this point the upper-fastening tacks are driven, after which the wipers are fully retracted to the position indicated by the line A—A'.

Figure 29:
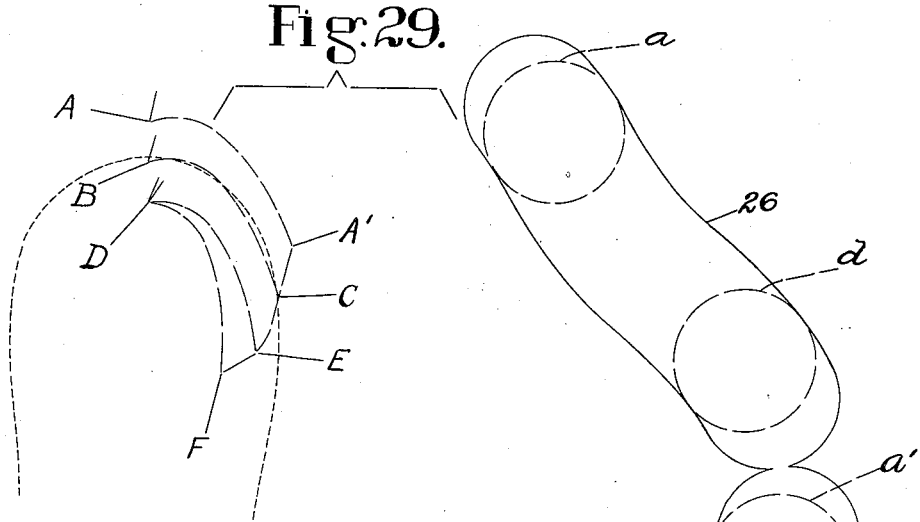
Fig. 29 is a view illustrating diagrammatically the movements of the wiper at one side of the heel end of the shoe.

To adapt the machine to operate in the best manner on very small shoes, especially women's shoes of the smaller sizes, the levers 16 (Fig. 3) are provided with additional holes 18' located farther from the axes of the levers than the holes in which the studs 18 are shown as located, these additional holes being arranged to receive the studs to connect the levers to the links 19. When the levers are connected to the links in this manner, movements of greater extent are imparted to the wipers by the rearward and forward movements of the slide 13. By reason of the shape of the cam grooves 26, 27 the additional inward movements over the shoe that the wipers thus receive are swinging movements only, about the center D, so that the wipers are closed well inward from the inner edge of the heel band. On the other hand, the additional retractive movements thus imparted to the wipers serve to swing their forward ends well outward away from the inner edge of the heel band. In Fig. 29, a, a' indicate the positions of the cam rolls 24, 25 in the grooves 26, 27 when the wipers are in the position indicated by A—A', the levers 16 and the links 19 being connected as shown in Fig. 3, and d, f indicate the positions of the rolls when the wipers are in the position indicated by D—F. It will be understood that when the parts are adjusted to operate on the smaller shoes the rolls are carried to positions nearer the ends of the grooves 26, 27 than illustrated in Fig. 29.

The wiper-carrying plates or wiper carriers 21 have formed in their lower faces arcuate guideways 30 (Fig. 3) which receive arcuate ribs 31 (Fig. 16) formed on the upper surfaces of wiper members 32. The guideway 30 and rib 31 of each wiper-carrying plate and wiper member are concentric with the meeting point of the wiper edges (that is, the point A, B or D, Fig. 29) so that the wipers may be adjusted, as hereinafter described, relatively to the plates 21 about the axis of their operative swinging movements for different sizes of shoes without any bodily forward or rearward movement. The wiper members 32 have fixed upon them blocks 33 from which tacks are driven to fasten the upper in lasted position, the lower faces of these blocks being in the same plane as the lower faces of the wiper members 32 and the edges of the blocks being shaped in substantial conformity to the curvature of the edge of the heel end of the shoe bottom. The members 32 and the blocks 33 are herein frequently referred to inclusively as the wipers, although it is mainly the blocks 33 that engage the upper and wipe it inwardly over the shoe bottom. Formed in the blocks 33 are tack pockets or passages 33' from which the tacks are driven, and as illustrated in Fig. 16 there is associated with each tack pocket a ball 34 and a spring 35 for supporting the tack in position to be driven, substantially in the manner disclosed in Letters Patent No. 1,886,279, granted on November 1, 1932 upon an application of Reginald D. Woodcock and Harold Lane. Alternatively, as shown in Fig. 18, there may be provided, for supporting the tack in each tack pocket, a spring 36 the lower end of which extends into and partially across the tack pocket through a slot formed in the side of the block 33. It will be observed that the spring 36 supports the tack by its head at one side of the head with the tack inclined so that its point is in contact with the block 33 at that side of the tack pocket that is farthest from the edge of the shoe bottom at the end of the overwiping operation, the tack being thus positioned in substantially the same relation to the wipers as it is by the parts shown in Fig. 16. It will be understood that when the tack is driven the spring 36 yields to permit the tack head and the driver to pass. The wiper members 32 have integral with them upwardly extending portions 38 provided with vertical passages 39 in alinement with the tack pockets 33' and arranged to provide guideways for tack drivers 40. Formed also in the upwardly extending portions 38 are inclined passages 41 through which the tacks are fed. The wiper members 32 are supported from below partly by the upper face of the member 2 and partly by a plate 43 fixed in a recess in the member 2 and substantially U-shaped, as illustrated in Figs. 2 and 3, the upper face of the plate 43 being in the same plane as the upper face of the member 2.

For purposes of wiper adjustment the upward extension 38 of each wiper member 32 has fixed to it an outwardly extending arm 44 (Figs. 3 and 16), and each arm has pivoted thereon at 45 a latch 46 having a knife edge pressed by a spring (not shown) into one or another of a series of notches 47 cut in the upper face of a bracket 48 fixed to the wiper-carrying plate 21. In that end of the latch 46 which is remote from the pivot 45 there is a slot into which extends a ball-end 49 (Fig. 17) of an arm 50 fixed on a shaft 51 rotatably mounted in the arm 44. The shaft 51 has fixed on its outer end a hand lever 52 by which it may be turned to lift the latch 46 from the notches 47. Clamped on the outer end of the arm 44 is an indicator 53 arranged to move with the arm over a series of indicating marks 54 provided on a plate 55 which is fixed on a cover 56 hereinafter referred to. The indicator 53 has on it a hand piece 57 toward which the hand lever 52 may be moved in lifting the latch 46 and by which swinging movement may be imparted to the arm 44. When the latches 46 have been lifted from the notches 47 in the manner described, the wiper members 32 and the parts that they carry may be swung by the arms 44 about the axes of the curved guide slots and ribs 30, 31 to adjust the wipers, each independently of the other, in accordance with the size of the shoe to be operated upon.

Each of the above-mentioned blocks 33 has in it, in the construction herein shown, nine tack pockets 33' (Fig. 4) from which a corresponding number of tacks may be driven into the shoe, and at the front end of each block 33 there is fastened to the upwardly extending portion 38 of the wiper member 32 a readily detachable end piece which serves as a continuation of the block 33 and has in it one or more tack pockets and one or more tack supply passages leading to the pockets, these detachable end pieces being provided to adapt the machine better for use on shoes of the larger sizes in the same general manner as disclosed in the above-mentioned Letters Patent No. 1,886,279. In Figs. 4 to 15, inclusive, there are illustrated a plurality of detachable end pieces 80 of different constructions for use on shoes of different kinds or sizes. Each end piece shown in Figs. 4, 5 and 6 comprises a block 58 fixed by a screw 59 and a dowel pin 60 to the portion 38 of the wiper member. Each block 58 is buttressed from above by a face 61 on the portion 38 and at its outer side by a face 62 on the same portion, so that it is effectively supported against the upward and outward pressure of the shoe upon it as it is moved inwardly over the shoe bottom. Each block 58 has in it two tack pockets, similar to the tack pockets in the blocks 33, each having associated with it a tack-retaining ball 34 and spring 35 such as hereinbefore described and having two inclined passages down which tacks are fed into the tack pockets. Each block 58 has mounted on it a yielding member 63 which is the actual shoe-engaging member and through holes 63' in which two tacks are driven from the tack pockets. The member 63 has projecting upwardly from it a stem 64 slidingly mounted in the block 58, and a spring 65 mounted in a bore in the block and engaging the member 63 presses the member downwardly. Downward movement of the member 63 is limited by a pin 66 which is fixed in the block 58 and is engaged by a shoulder on the stem 64.

In Figs. 7, 8 and 9 there is shown a block 67 provided with a yielding work-engaging member 68 similar to the work-engaging member 63 of the block 58 but of smaller size, considered with reference to its extent lengthwise of the edge of the shoe bottom, this block and work-engaging member being constructed for the driving of only one tack instead of two. The block 67 can be fixed to the portion 38 of the wiper member 32 by the same screw 59 and dowel pin 60 as when the block 58 is used. The work-engaging member 68 has a stem 69 guided in the block 67, and this stem has in it a bore 70 to receive the endmost driver 40 of the group of eleven drivers associated with the corresponding wiper. When the block 67 is in use this endmost driver is inoperative to drive tacks, but in view of the provision of the bore 70 to receive it, it need not be removed from the machine unless desired. A spring 71 forces the member 68 downwardly, its downward movement being limited by a pin 72 engaged by a shoulder on the stem 69. The block 67 has a single tack pocket 67' with tack-retaining ball and spring and a single inclined passage through which tacks are fed to the tack pocket.

The use of end pieces having yielding work-engaging members, as illustrated in Figs. 4 to 9, inclusive, is of particular advantage as permitting the wiping operation to be extended somewhat forwardly of the heel seat proper on certain kinds of shoes without damage to the shoe materials. In operating, for example, upon a shoe of the welt type which, at the time of the heel-seat lasting operation, has unlasted upper material adjacent to the front end of the heel seat where the rear end of the insole lip or rib is located, the yielding work-engaging members 63 or 68, which have rounded inner edges, may be used to wipe this unlasted portion of the upper over the lip or rib without damage to the latter because of the provision for yield of the members heightwise of the shoe. Similarly the wiping action may be extended forwardly of the heel seat without damage on shoes having unlipped insoles but in which there is an arched formation of the shoe bottom beginning close to the heel seat, as in some women's shoes of the McKay type which are provided with high heels. In the latter case the yielding work-engaging members 63 or 68, which have rounded forward edges as well as rounded inner edges, will act yieldingly to wipe the upper inwardly on the arched portion of the shoe bottom without any damage. In operating on shoes having lipped or ribbed insoles tacks will not usually be required to hold portions of the upper upon which the yielding members 63 or 68 operate, and this is true likewise as to the portions of the upper operated upon by these members in the case of McKay shoes of the above-mentioned character. Accordingly the supply of tacks to the tack pockets in the members 67 or 58 may be cut off by the use of well-known means adapted for this purpose. There are, however, some other classes of work on which it may be desirable to use such yielding members in operating on portions of the shoe where upper-holding tacks are needed as, for example, shoes in which the uppers have surface ornamentation in the form of a band or strip extending upon the shoe bottom close to the heel seat and producing an abrupt thickening of the upper materials in locations near, if not actually on, the heel seat.

Novel features involved in the above-described construction of end pieces provided with yieldable work-engaging members are not claimed herein, since they are the invention of Fred Ricks and are claimed in a copending application Serial No. 622,706, filed on July 15, 1932.

In Figs. 10 to 15, inclusive, there are shown detachable end pieces which are not provided with yielding members and the sole purpose of which is to provide for variation in the extent of the wiping action lengthwise of the shoe and of the number of fastenings driven into the shoe. The end piece shown in Figs. 10, 11 and 12 is constructed for the driving of only one tack and comprises a block 73 which can be fixed to the portion 38 of the wiper member 32 by the same screw 59 and dowel pin 60 that are used to hold the previously described blocks 58 and 67. The block 73 has a single tack pocket with tack-retaining ball and spring and an inclined bore down which tacks are fed to the pocket. The block 73 is cut away at 74 to permit the endmost driver to remain idly in the machine, although the driver may be removed if desired. The end piece shown in Figs. 13, 14 and 15 has provision for the driving of two tacks, and the block 75 of this end piece is about twice the length of the block 73, measured along its work-engaging edge. This end piece can be fastened in position by the same means as previously described for fastening the other end pieces. In these different ways provision is afforded for driving eighteen, twenty or twenty-two tacks according to the size of the shoe being operated upon. The tack-supplying mechanism is arranged to deliver the desired number of tacks to the tack pockets and is to be provided with any suitable well-known means for preventing separation and delivery of tacks from some of the raceways if less than twenty-two tacks are to be driven.

For conducting the tacks from the tack-supplying mechanism to the several tack pockets there are provided flexible tubes 76 (Figs. 2 and 16) communicating at their lower ends with the inclined passages 41 in the upwardly extending portions 38 of the wiper members and with the corresponding passages in the detachable end pieces. The tack-supplying mechanism comprises two tack pots 77, 78 (Figs. 22 and 23) arranged one above the other on a bracket 79 on the head of the machine for supplying respectively tacks of different lengths, and associated with each tack pot is tack-separating and delivering mechanism (not shown) constructed substantially as disclosed in Letters Patent No. 1,129,881, granted on March 2, 1915 upon an application of R. F. McFeely and arranged to deliver tacks into the tubes 76. It will be understood that the different tack-separating and delivering mechanisms are operated by oscillatory movements of the respective tack pots. For thus oscillating the tack pots there is provided a cam-operated slide 80 similar to the corresponding slide shown in Letters Patent No. 1,583,044, this slide being connected at its upper end by a link 81 to the lower end of a rack bar 82 arranged to mesh with one or the other of two pinions 83, 84 formed respectively on the ends of the lower and upper tack pot shafts. The rack bar 82 is slidingly mounted in a guide member 85 which is supported about midway of its length on a pivot 86 on the bracket 79, the pivot having an eccentric portion, as shown in Fig. 22, so that by turning it the guide member and rack bar may be adjusted in proper relation to the pinions 83, 84. The guide member 85 may be swung on its pivot 86 to cause the rack bar 82 to engage either of the pinions 83, 84 accordingly as it is desired to utilize long or short tacks, and for thus swinging the guide member there is provided a cam slide 87 which has formed in it a cam slot 88 cooperating with a roll 89 carried by an arm on the member 85. The slide 87 is guided in a bracket 90 fixed to the bracket 79 and is pivotally connected at its lower end to a link 91 the lower end of which is pivotally connected to a hand lever 92. The hand lever 92 is pivoted on a shaft 93 rotatably mounted in the bracket 79 and carries a spring plunger 94 arranged to snap into one or the other of two recesses, one of which is shown at 94', provided in the bracket 79 to hold the lever 92 in adjusted position. It will be understood that when the lever 92 is pulled downwardly by the operator the guide member 85 is swung into position to connect the rack bar 82 with the pinion 83 on the lower tack pot shaft, as illustrated in Fig. 23, and that when the lever is moved upwardly the rack bar is connected to the pinion 84 of the upper tack pot shaft. Either tack-supplying mechanism may thus be rendered operative to deliver tacks to the tack pockets through the tubes 76.

The machine herein shown is further provided with means whereby the delivery of tacks may be prevented, and also if desired the operation of the tack drivers may be stopped, to permit the machine to be operated idly without waste of tacks or without driving tacks into the shoe. This means comprises a hand lever 95 fixed on the above-mentioned shaft 93 which is a rock shaft. The shaft 93 has fixed on it a stop arm 96 which is movable by the lever 95 into the path of a lug 97 on the tack pot 77. The hand lever 95 is further connected by a link 98 to a bell-crank lever, including a stop arm 99, pivoted on the bracket 79, this arm being movable by the hand lever into the path of a lug 100 on the tack pot 78. The arms 96 and 99 are thus arranged to stop the movements of the yieldingly operated tack pots associated therewith before the tacks have been separated, so as to prevent delivery of any tacks to the tack pockets. The hand lever 95 also controls, through an arm 101 fixed on the shaft 93, a slide 102 which, upon continued movement of the hand lever after the stop arms 96 and 99 have arrived in positions to stop the tack pots, is moved under a head 103 on a vertical slide 104 which is moved downwardly in the operation of the tack drivers substantially as disclosed in Letters Patent No. 1,852,015. It will be understood that the slide 104 is raised by a cam, and when released by the cam is forced downwardly with other driver-operating parts by a spring; and when the slide 102 is moved under the head 103 it prevents the slide and the driver-operating parts connected thereto from being moved downwardly by the spring to operate the drivers. By the means described, therefore, either the tack-separating and delivering mechanism only, or this mechanism and also the driver-operating mechanism, may be rendered inoperative at the will of the operator. The hand lever 95 carries a spring plunger 105 (Fig. 1) arranged to snap into any one of three recesses 106 in the bracket 79 to hold the hand lever in an idle position, in a position in which the tack-separating and delivering mechanism only is inoperative, or in a position in which this mechanism and also the driver-operating mechanism are inoperative. The mechanism thus provided for controlling the tack-supplying means and the driving means is in many respects similar to what is disclosed and claimed in Letters Patent No. 1,901,167, granted on March 14, 1933 upon an application of J. C. Jorgensen.

To assist in controlling the shoe and in determining the position of the heel seat in the lasting operation, the machine herein shown is provided with a holddown in the form of a vertical bar 107 (Figs. 1, 24, 25 and 26) having a suitably shaped lower end 108 for engagement with the heel end of the insole. It is desirable that as much as possible of the heel end of the insole, whatever may be the size of the shoe, be engaged by the lower end of the holddown, to assist in preventing any tipping of the shoe on its support and any buckling of the heel end of the insole as the wipers move inwardly over the heel seat. Accordingly the construction is such as to permit holddowns having lower faces of different areas for operating respectively on large and small shoes, such as men's and women's shoes, to be readily mounted in the machine, each holddown being of such size as not to be engaged by the wipers in their adjustments as hereinbefore described for shoes of different sizes. The bar 107 is pivoted at its upper end by a horizontal pivot 109 on the forward end of a substantially horizontal arm 110 (Fig. 1) of a bell-crank lever 111. This lever is fixed to a horizontal shaft 112 extending across the machine and rotatably mounted in the head 3. The arm 110 has three separated bosses (not shown) each of which is pinned to the shaft 112, and two bearings for the shaft on the head 3 are located respectively between the middle and end bosses. Fixed to the head 3, one at each side of the bar 107, are a pair of angle plates 113 having horizontal rearwardly extending arms 114 bolted to the head 3 and vertically depending arms 115 in engagement with opposite sides of the bar 107, the arms 115 having in their lower ends vertical slots 116 which receive the ends of a pin 117 extending laterally from the bar 107. The arms 115 and the slots and pin guide the bar 107 for upward and downward movements, while permitting the bar to be readily removed for the substitution of a bar of different size upon removal of the pivot 109.

The bell-crank lever 111 has a depending arm 118 which is forked and has rotatably mounted in its lower end a pin 119 extending across the fork. The pin 119 is bored transversely and in the bore is rotatably mounted a sleeve 120 provided at its forward end with a hand wheel 121 by which it may be rotated, the sleeve being held against endwise movement relatively to the pin by a shoulder on the sleeve at one side of the pin and a collar 122 fixed to the sleeve at the opposite side of the pin. At its rear end the sleeve 120 has threaded in it the forward end of a rearwardly extending rod 123 the rear end of which is pivoted to a cam-operated lever 124, this lever being pivoted on the head 3 of the machine by a horizontal pivot 125. The lever 124 carries a cam roll 126 engaged by a cam (not shown) on the previously mentioned cam wheel 11. A spring 127 connected to the lever 124 and to the lever 5 (Fig. 21) hereinbefore referred to as operating the mechanism that draws the shoe yieldingly against the heel band, holds the cam rolls on these two levers against their operating cams. It will be understood that the cam that operates the lever 124 moves the holddown 107 downwardly, through the connections described, in the operation of the machine, and that the holddown is moved upwardly by the spring 127 when permitted by the cam. Upward movement of the holddown may be limited by a screw 128 (Fig. 1) threaded in a lug 129 upon the lever 124 and arranged to engage a part of the head 3. It will be evident that by turning the sleeve 120 by means of the hand wheel 121 the holddown may be adjusted vertically.

To assist the holddown 107 in positioning the shoe and in preventing lengthwise tipping movements of the shoe, there is provided, in one form of construction herein shown, a presser foot 130 (Fig. 24) arranged to engage the marginal portion of the upper on the rear end of the heel-seat face of the shoe at the rear of the holddown, this presser foot being formed on the rear end of a lever 131 pivotally and slidably supported in the holddown bar 107. The lever 131 is supported against upward movement relatively to the bar 107 by a pin 132 rotatably mounted in the bar and provided with a recess in which the upper portion of the lever lies, the lever 131 has in it a slot 133 which receives the end of a small pin 134 fixed in the pin 132. The slot 133 and pin 134 permit the lever 131 to be moved relatively to the bar 107 forwardly and rearwardly, and the pin 132 permits the lever to rock about an axis extending laterally of the shoe. At its forward end the lever 131 is forked and carries a pin 135 rotatably mounted therein. Extending through an opening in the pin 135 is a rod 136 which is pivotally connected at its upper end by a pin 137 to a slide 138. This slide is connected to the bar 107 by screws 139 which extend through slots 140 in the slide, these connections permitting upward and downward movements of the slide relatively to the bar. The rod 136 has threaded on its lower end a nut 141 in engagement with the pin 135, the nut by its adjustment determining the position of the lever 131 with respect to swinging movement about the axis of the pin 132 and accordingly determining the position of the presser foot 130 heightwise of the shoe. The rod 136 extends through the bent lower end 142 of a spring bar 143 which is fixed at its upper end portion to the bar 107 by the screws 139. The rod has mounted on it a spring 144 which bears against the bent end 142 and the pin 135 and holds the pin yieldingly against the nut 141. In the construction shown the opposite ends of the above-mentioned pin 137, which connects the rod 136 to the slide 138, extend into recesses formed in the ends of levers 145 rotatably mounted on a pin 146 fixed in the bar 107. Fixed in the depending arms 115 of the angle plates 113 are pins 148 arranged to engage the ends 147 of the levers 145. It will be evident that the spring 144, by its tendency to move the rod 136 downwardly, holds the ends 147 of the levers against the pins 148. At a predetermined time in the operation of the machine the bar 107 is raised to permit the shoe to be pressed more forcibly up against the wipers, as more particularly hereinafter described, and when the bar is thus raised the levers 145 are, by reason of their engagement with the pins 148, rocked about the pin 146 and raise the rod 136, thereby swinging the lever 131 about the axis of the pin 132 a distance so proportioned to the amount of upward movement of the bar 107 that the position of the presser foot 130 heightwise of the shoe is substantially unchanged. This insures that the extreme rear end of the shoe will not be raised too high relatively to the wipers. The parts 145 and 148 may, however, be omitted and the slide 138 fixed to the bar 107 so that the presser foot 130 will be moved upward and downward with the bar.

When the wipers are moved inwardly over the heel seat the wiper blocks 33 engage the presser foot 130 and push it inwardly over the heel seat against the resistance of the spring bar 143, such movement being permitted by the slot 133, and when the wipers are retracted the presser foot is returned by the spring bar 143. Besides assisting in positioning the shoe heightwise and in preventing it from tipping longitudinally, the presser foot 130 acts, in its movement over the heel seat, to smooth the upper materials in front of the wipers and prevents any of the upper from becoming pinched, pleated or damaged by entering such small recess as there may be between the wiper blocks 33 where these blocks are substantially contiguous to each other.

To assist further in positioning the shoe and preventing longitudinal tipping thereof there is provided, as illustrated in Figs. 24 and 25, an auxiliary holddown member or shoe rest 150 arranged to engage the insole at the forward portion of the heel seat or the rear portion of the shank in front of the lower end 108 of the holddown 107 and substantially midway between the opposite side edges of the shoe bottom. The shoe rest 150 is formed on the lower end of a bar 151 (Figs. 1 and 2) which is vertically adjustable by means of a screw 152 in a supporting bracket 153 mounted on the same pivot 109 as the holddown 107, the head of the screw extending into a recess in the bracket to prevent lengthwise movement of the screw. The bracket 153 has threaded in it a screw 154 arranged to bear on the head of the upper one of the two screws 139 for adjustably swinging the bracket about the pivot 109 to adjust the shoe rest 150 lengthwise of the shoe, a spring plunger 155 mounted in the arm 110 acting on the bracket to swing it in one direction and thus to maintain the screw 154 in contact with the screw 139.

Figure 30:
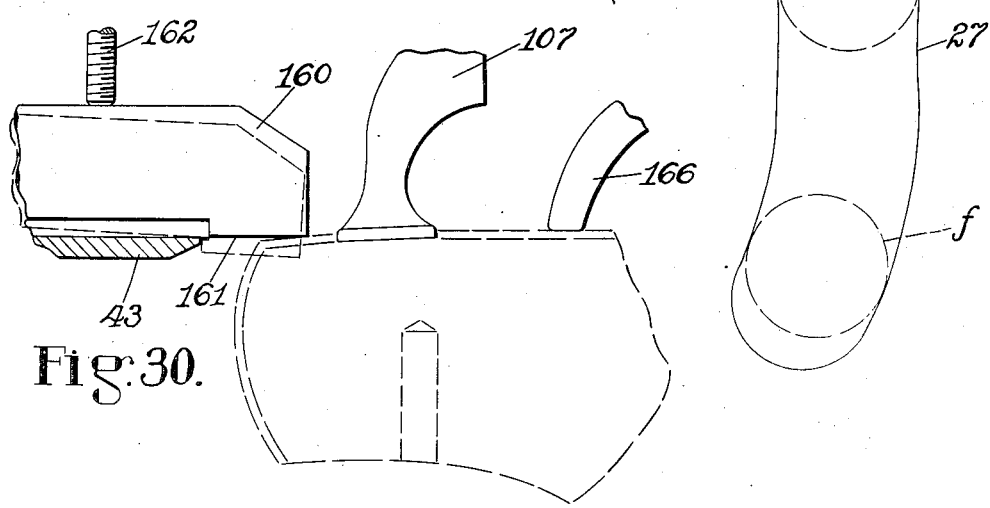
Fig. 30 is a view in left-hand side elevation, with parts in section, showing different means than illustrated in Fig. 24 for positioning the heel end of the shoe.
Figure 31:
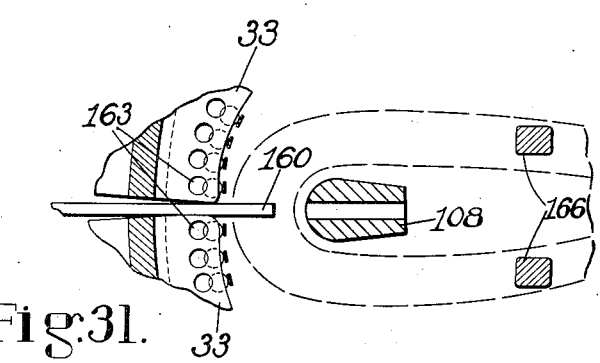
Fig. 31 is a plan view, with parts in section, of the structure shown in Fig. 30.

Instead of the presser foot 130 there may be provided a thin vertically disposed plate 160 (Figs. 30 and 31) which projects forwardly between the rear ends of the wiper blocks 33 and over the rear end of the heel-seat face of the shoe when the latter is moved back into the heel band. This plate is arranged to contact with the margin of the upper over the insole and to limit upward movement of the extreme rear end of the shoe. It will be evident that when this plate is used the wiper blocks 33 at their rear ends must be differently shaped than illustrated in Fig. 4 to allow room for the plate between them, as shown in Fig. 31. The plate 160 is preferably mounted, by means not herein shown, for limited swinging movements heightwise of the shoe, as illustrated by full and broken lines in Fig. 30, and in its lowest position it is arranged to be supported by the fixed plate 43 hereinbefore referred to as under the wipers. The front portion of the plate 160 is stepped down where it projects forwardly of the plate 43, and the lower face 161 of this stepped-down portion is substantially at the level of the lower face of the plate 43 when the plate 160 is in its lowest position. The upper edge of the plate 160 is arranged to be engaged by the lower end of an adjustable screw 162 threaded in the cover plate 28, and by adjusting this screw the heightwise position of the upper-engaging face 161 of the plate when the shoe is pressed up against it may be varied in accordance with the varying thicknesses of the upper materials of different shoes to position the rear end of each shoe at the right height relatively to the plane of the wipers. In the wiping operation the wiper blocks 33 advance with their rear ends substantially in contact with the opposite and parallel, or substantially parallel, vertical side faces of the plate 160. The arrangement is further such that at the end of the wiping movement of the wipers the plate 160 has substantially no projection either forwardly of the wiper blocks 33 or below the wiping plane. In this construction the wipers preferably swing about axes located substantially at the rearmost tack holes 163 (Fig. 31) as they are closed inwardly over the heel seat.

Instead of the shoe rest 150 there may be provided a pair of shoe rests 166 (Figs. 30 and 31) arranged to engage the margin of the upper over the insole close to the opposite side edges of the shoe bottom in the shank portion, just in front of the heel breast line, and in a welt or a turn shoe outside of the channel lip on the sole member. These rests, while assisting in positioning the shoe heightwise, also assist in preventing it from tipping laterally as well as longitudinally and further act as gages to assist in determining the bodily position of the shoe laterally. The rests 166 are mounted, by means not herein shown, on a bar corresponding to the bar 151 which supports the rest 150, and are adjusted vertically and lengthwise of the shoe by means such as hereinbefore described for thus adjusting the rest 150. In addition, the rests 166 will preferably be mounted on their supporting bar for adjusting movements toward and from each other for different widths of shoes.

The heel band 168 for clamping the shoe around the heel end is supported and operated by means for the most part substantially like that shown in Letters Patent No. 1,583,044. For supporting the front end portions of the band, however, in the construction herein shown, there are fixed to the band blocks 170 (Figs. 19 and 20) which are supported on brackets 171 fixed on arms 171' corresponding to the band-closing arms disclosed in the above-mentioned Letters Patent. The blocks 170 have projecting laterally from them upper and lower flanges 172 and 173 which engage respectively the upper and lower faces of projections 174 on the brackets 171. Extending downwardly from the lower face of each projection 174 is a pin 175 which lies in a slot 176 extending in directions lengthwise of the shoe in the lower flange 173. It will be evident that the forward ends of the band are thus supported by the upper flanges 172 in engagement with the projections 174 and that the pin-and-slot connections 175, 176 between the blocks 170 and the brackets 171 permit relative movements lengthwise of the shoe between the blocks and the brackets as the heel band is closed or opened.

As further herein illustrated, the machine is provided with a depending lever 177 (Fig. 1) in place of the bell-crank lever 138 disclosed in Letters Patent No. 1,583,044, this lever being a part of the shoe-controlling mechanism whereby the heel band is operated to clamp the shoe and the jack is operated to force the shoe positively against the heel band and to press it up against the holddown. The lever 177 is mounted on a pivot 178 corresponding to the pivot of the lever 390 disclosed in said Letters Patent for operating the holddown, the latter lever of the earlier construction being dispensed with by reason of the provision of the different holddown-controlling means hereinbefore described. The lever 177 carries a roll 179 engaged by a cam (not shown) on the cam wheel 11, and at its lower end has formed on it a gear segment 180 which meshes with a pinion 181 corresponding to the pinion 136 of the above-mentioned Letters Patent for operating the heel band and jack. The roll 179 is mounted on an eccentric portion 182 of a shaft 183 rotatably mounted in the lever 177. The shaft 183 has fixed on it an arm 184 pivotally connected at 185 to a toggle link 186. This toggle link is pivotally connected at 187 to a second toggle link 188 which is mounted on the pivot 178. A spring 189 connected to the arm 184 and the toggle link 188 normally holds the toggle in a straightened condition with a face 190 on the link 186 in engagement with a face 191 on the link 188. With the toggle in this condition the axis of the roll 179 and the axis of the shaft 183 are in substantially the same horizontal plane, the axis of the roll being on that side of the axis of the shaft which is nearest the cam. If the machine should come to a stop before completing its cycle, by reason, for example, of abnormal resistance of the shoe to the movement of the wipers, a hand lever 192 formed on the toggle link 186 may be pulled forwardly by the operator to break the toggle and by rotation of the shaft 183 to displace the cam roll 179 relatively to the lever 177 and swing it away from the cam. This serves to relieve the clamping pressure of the heel band on the sides of the shoe and the pressure of the end of the shoe against the band and of its bottom face against the holddown enough to permit the machine to complete its cycle under power or to facilitate the completion of the cycle by manual operation. The roll 179 is automatically returned to its operative position by the spring 189 near the end of the cycle when a low part of the cam is opposite the roll.

Figure 28:
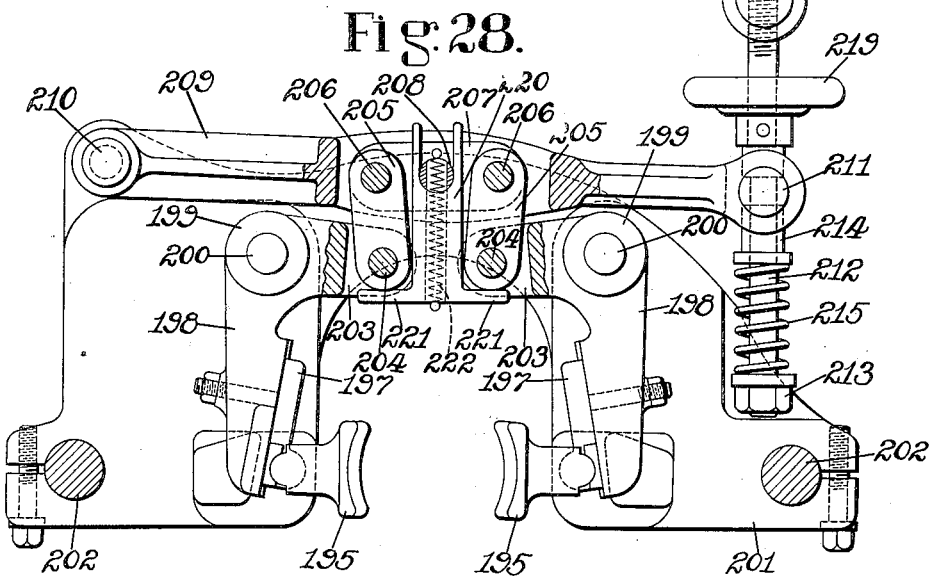
Fig. 28 is a plan view of the mechanism shown in Fig. 27 with parts in section.
Figure 27:
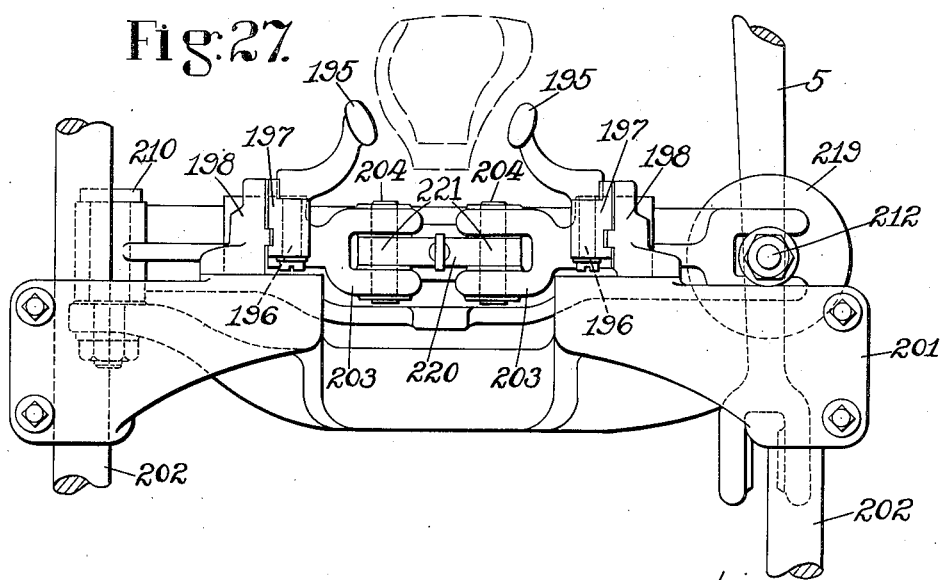
Fig. 27 is a view in front elevation, on a larger scale than Fig. 2, showing especially the mechanism for supporting the last and shoe at the sides against longitudinal and lateral tipping movements.

There is further provided in the machine herein shown additional means to assist in supporting and holding the shoe and last against tipping movements longitudinally and laterally, comprising clamp members 195 (Figs. 2, 27 and 28) arranged to engage the opposite sides of the shoe or last, (the term shoe being frequently used herein as inclusive of the last) in locations forwardly of the spindle hole in the last at or near the rear end of the waist portion of the shoe, and spaced substantial distances from the bottom of the shoe where the sides of the shoe curve inwardly toward its top portion. The clamp members thus assist in relieving strain on the heel spindle or strain of the spindle on the last. These members are pivoted by vertical studs 196 on blocks 197 mounted for adjustment in directions lengthwise of the shoe on forwardly projecting arms 198 of a pair of bell-crank levers 199 which are pivoted on vertical studs 200 fixed in a supporting bracket 201 secured to posts 202 on the machine frame. The forward ends of the arms 198 are supported by faces on the bracket 201, as shown in Fig. 27. The two studs 200 are positioned just at the rear of the heel band. The other arms 203 of the bell-crank levers 199 extend toward each other and have pivoted to them by vertical studs 204 rearwardly extending substantially parallel links 205. The links 205 are pivotally connected by vertical studs 206 to the opposite ends of an equalizing lever 207 which is pivoted midway of its length on a vertical stud 208 fixed in an operating arm or lever 209. The arm 209 extends across the machine and at its left-hand end is pivoted on a vertical stud 210 fixed in the supporting bracket 201, the right-hand end of the arm being forked and carrying a pin 211. Extending through the pin 211 is a rod 212 which has threaded on it at its forward end a nut 213, and between this nut and a sleeve 214 loosely mounted on the rod and engaging the pin 211 is a spring 215. The rod 212 at its rear end is threaded through a pin 216 rotatably mounted in a link 217 which is connected by a pin 218 to the lever 5 (Fig. 21) previously referred to as provided for swinging the jack to force the shoe yieldingly against the heel band. The rod 212 has fixed on it a hand wheel 219 by which it may be turned to adjust the members 195 toward or from each other. Further to control these members there is provided a bar 220 forked at its rear end to straddle the pin 208, this bar at its front end having lateral extensions 221 arranged to engage the forward ends of the links 205. A spring 222 connected to the pin 208 and to the front end of the bar 220 pulls the bar rearwardly. The bar 220 accordingly acts on the links 205 to centralize the clamp members 195 with respect to movements laterally of the shoe when the members are in inoperative positions. It will be evident that when the lever 5 is operated to swing the shoe yieldingly against the heel band it operates the arm 209 yieldingly through the spring 215 to move the clamp members 195 into clamping positions forwardly of but near the heel band. Since the clamp members are thus yieldingly operated they adjust themselves in accordance with the width of each shoe, and by reason of the provision of the equalizing lever 207, which permits displacement of both clamp members in the same direction laterally of the shoe to one side or the other, the members readily adjust themselves to each shoe regardless of the shape or lateral position of the portions of the shoe that they engage.

As hereinbefore suggested, the tack-driving mechanism in the machine herein shown is substantially like that disclosed in Letters Patent No. 1,852,015. The tack drivers are operated through a link 225 (Fig. 1) from a lever 226 impelled downwardly by a spring when released by the controlling cam. Downward movement of the lever and drivers is limited by stop faces 227 on the lever in engagement with stop pads 228 on the frame.

Extending forwardly from the head of the machine are two supports 229 (Figs. 1 and 2) arranged one at each side of the jack in such positions that when a shoe and last are on the spindle of the jack, with the jack in its forwardly swung inoperative position, the shoe and last may be turned on the spindle into a position for the toe to rest on either of the supports 229, each of which comprises a horizontal rubber-covered bar. The operator's hands are accordingly free to manipulate and position the upper materials at one side of the heel seat with the toe on one of the supports, after which he may turn the shoe and position its toe on the other support and then manipulate the materials at the other side of the heel seat. The shoe may then be turned into proper position for the jack to carry it rearwardly into the heel band. The toe supports thus cooperate with the heel spindle to afford facilities on the machine for manual operations on the shoe such as have been afforded heretofore by revoluble bench jacks.

As hereinbefore stated, the construction of the machine is such that holddowns of different sizes may be mounted interchangeably in the machine for operating respectively upon men's and women's shoes. In the use of such interchangeable holddowns there is danger that after operating upon men's shoes the operator, in adapting the machine to operate upon women's shoes, may omit to change the holddown, with the result that when the machine is operated the wipers, because of having been adjusted to move into closer relation to each other than when men's shoes were being operated upon, will engage the holddown and be prevented thereby from completing their closing movements. The machine will thus be prevented from completing its cycle and parts will probably be broken or otherwise damaged. On the other hand, if the machine has been operating upon women's shoes and the operator, desiring to operate upon men's shoes, changes the holddown to one of larger size suitable for men's shoes and does not also suitably adjust the wipers, similar results will occur. In the construction shown there is accordingly provided means for preventing such danger of damage to the machine. For this purpose the pin 117 in the holddown bar 107 is, in the holddown for men's shoes, extended at each side of the bar as shown in Figs. 2 and 3, and when in position in the machine is arranged to engage at each end a cam-shaped face 230 on an arm 231 of a lever 232 pivoted on short shafts 233 fixed in lugs on the cover 56. Each lever 232 has a rearwardly and forwardly extending portion 234 provided with a plane lower face extending over a plunger 235 (Fig. 16) mounted in the bracket 48 previously described as fixed on the wiper-carrying slide 21. The upper end of the plunger 235 is held up against the lower face of the portion 234 of the lever 232 by a spring 236. It will be understood that there are levers 232 and plungers 235 at the opposite sides of the wiper mechanism. When the holddown for men's shoes is in position in the machine the extended ends of the pin 117 act through the levers 232 to press down the plungers 235 into the paths of the laterally extending arms 44 by which the wiper members 32 are adjusted, so as to prevent these arms and the wipers from being adjusted into positions for operation upon women's shoes or, in other words, into such positions that with the men's holddown in the machine the wiper blocks 33 would engage the lower end 108 of the holddown in the operation of the machine. When the holddown for women's shoes, which does not have the pin 117 extended as illustrated, is in position in the machine, the arms 44 may be adjusted forwardly into positions for operation upon women's shoes, since the plungers 235 are then raised by their springs 236 out of the paths of movement of the arms. When the arms 44 are in the last-mentioned positions they are below the plungers 235, and since these plungers when raised swing the arms 231 toward each other, the faces 230 upon these arms prevent a holddown for men's shoes, which has the extended pin 117, from being placed in the machine until the arms 44 have been moved back far enough to permit the plungers 235 to be depressed. Accordingly it is impossible to mount the men's holddown in the machine with the wipers adjusted in positions to operate on women's shoes.

In the use of the machine the operator mounts the shoe on the jack and after performing any manual operations on the heel end portion of the upper materials that may be necessary with the toe resting first on one and then on the other of the supports 229, he swings the jack rearwardly and raises it by the treadle to press the heel end of the shoe up against the holddown 107 and against such other bottom engaging members as are provided in the machine, for example the presser foot 130 and rest 150 (Fig. 24), these members cooperating with the holddown 107 in positioning the shoe not only at the proper height but with the heel seat in the proper plane relatively to the plane of the wipers. At this time the holddown 107 and the shoe rest 150 are in their highest positions. The machine is then started in operation, whereupon the lever 5 and parts connected therewith operate upon the jack to press the shoe yieldingly back against the heel band, this lever also operating through the connections described to swing the clamp members 195 into supporting relation to the sides of the shoe in front of the heel band. In predetermined time relation to these operations the heel band is closed into clamping relation to the upper at the sides of the shoe, the holddown 107 and the shoe rest 150 are moved downwardly a short distance to depress the shoe, the jack is operated positively to force the shoe still more firmly back against the heel band, and through the jack the shoe is pressed up yieldingly by power against the holddown and other bottom-engaging members. The first operative movement of the wipers over the heel seat then takes place, the presser foot 130 being moved inwardly over the heel seat by contact of the wipers therewith, and thereafter the wipers are retracted nearly to the edge of the heel seat, the presser foot 130 moving outwardly with them. As the wipers are then again advanced and closed inwardly over the heel seat, the holddown 107 and the shoe rest member 150 are raised a short distance to permit the shoe to be forced up yieldingly against the wipers with greater pressure through the jack-controlling mechanism, the jack being at the same time operated positively to press the shoe still more firmly back into the heel band and the band being pressed more forcibly against the upper at the sides of the shoe. As the holddown 107 is thus raised, the presser foot 130 engaging the margin of the upper on the rear end of the heel seat is maintained at substantially the same height through the mechanism hereinbefore described, so that the shoe is pressed more forcibly against this presser foot as well as against the wipers in the second wiping movement of the wipers. At the end of the second inward wiping movement of the wipers the tacks are driven, after which the parts of the machine are returned to their starting positions.

If the plate 160 (Figs. 30 and 31) is used in place of the member 130, it is pressed up against the stop screw 162 by contact of the shoe therewith as the latter is raised by the jack and acts on the shoe in the manner hereinbefore described. If the shoe rests 166 are used in place of the rest 150, they are controlled in the same manner as the rest 150, as will be evident from the detailed description. Since they engage the upper farther forwardly than the limit of the advancing movement of the wipers, they do not interfere with the operation of the wipers.

Having described the invention, what we claim as new and desire to secure by Letters Patent of the United States is:—

1. In a lasting machine, end-lasting wipers formed to extend around an end of a shoe, means for imparting operative movements to said wipers, and guiding devices associated respectively with the different wipers for determining the paths in which they move when they are operated, said guiding devices being constructed to determine such paths for the wipers that they receive simultaneous advancing movement lengthwise of the shoe and closing movements laterally of the shoe during a portion of the wiping operation and thereafter receive further closing movements without any substantial advancing movement.

2. In a lasting machine, end-lasting wipers formed to extend around an end of a shoe, means for imparting operative movements to said wipers, and guiding devices associated respectively with the different wipers for determining the paths in which they move when they are operated, said guiding devices comprising, for each wiper, cam means formed and arranged to determine such a path for the wiper that it advances bodily lengthwise of the shoe and moves laterally of the shoe during a portion of the wiping operation and thereafter continues its movement laterally of the shoe without any substantial further advancing movement.

3. In a lasting machine, end-lasting wipers formed to extend around an end of a shoe, means for imparting operative movements to said wipers, and guiding devices associated respectively with the different wipers for determining the paths in which they move when they are operated, said guiding devices comprising, for each wiper, a pair of cams and members cooperating therewith to determine such a path for the wiper that it advances bodily lengthwise of the shoe and swings laterally of the shoe during a portion of the wiping operation and thereafter continues its swinging movement without any substantial further advancing movement.

4. In a lasting machine, end-lasting wipers formed to extend around an end of a shoe, means for imparting operative movements to said wipers, members movable in unison with the wipers, and cams for engaging said members to determine the paths in which the wipers move, said cams being so formed and arranged that the wipers receive simultaneous advancing movement lengthwise of the shoe and closing movements laterally of the shoe during a portion of the wiping operation and thereafter complete the wiping operation by closing movements only.

5. In a lasting machine, end-lasting wipers formed to extend around an end of a shoe, wiper carriers connected to said wipers for operating them, means for imparting operative movements to said wiper carriers, rolls movable with the wiper carriers, and cams arranged to engage said rolls to determine the paths of movement of the wiper carriers and the wipers, said cams being so formed and arranged that the wipers are advanced bodily lengthwise of the shoe and closed laterally of the shoe during a portion of the wiping operation and are thereafter further closed without any substantial advancing movement.

6. In a lasting machine, end-lasting wipers formed to extend around an end of a shoe, wiper carriers connected to said wipers for operating them and relatively to which the wipers are adjustable for shoes of different sizes, means for imparting operative movements to said wiper carriers, and guiding devices associated respectively with the different wiper carriers for determining the paths in which the wipers move when they are operated, said guiding devices being constructed to determine such paths for the wipers that they receive simultaneous advancing movement lengthwise of the shoe and closing movements laterally of the shoe during a portion of the wiping operation and thereafter receive further closing movements without any substantial advancing movement.

7. In a lasting machine, end-lasting wipers formed to extend around an end of a shoe, wiper carriers connected to said wipers for operating them and relatively to which the wipers are adjustable for shoes of different sizes, means for imparting operative movements to said wiper carriers, and guiding devices associated respectively with the different wiper carriers for determining the paths in which the wipers move when they are operated, said guiding devices comprising, for each wiper carrier, a pair of cams and members cooperating therewith to determine such a path for the wiper that it advances bodily lengthwise of the shoe and swings laterally of the shoe during a portion of the wiping operation and thereafter continues its swinging movement without any substantial further advancing movement.

8. In a lasting machine, end-lasting wipers formed to extend around an end of a shoe, wiper carriers connected to said wipers for operating them, and means for moving said wiper carriers in such paths that the wipers receive advancing movement lengthwise of the shoe and swinging movements laterally of the shoe during a portion of the wiping operation and thereafter receive further swinging movements without any substantial advancing movement, the wipers being adjustable relatively to the wiper carriers, each about an axis substantially coincident with the axis of its operative swinging movement, to position them for use on shoes of different sizes.

9. In a lasting machine, end-lasting wipers formed to extend around an end of a shoe, and operating means for imparting to said wipers advancing movement lengthwise of the shoe and closing movements laterally of the shoe during a portion of the wiping operation and for thereafter imparting to them further closing movements of variably predetermined amount without any substantial further advancing movement.

10. In a lasting machine, end-lasting wipers formed to extend around an end of a shoe, operating means for imparting to said wipers movements inwardly over the shoe bottom, and devices associated respectively with the different wipers for guiding them in such paths that they receive simultaneous advancing movement lengthwise of the shoe and closing movements laterally of the shoe during a portion of the wiping operation and thereafter receive further closing movements without any substantial advancing movement, said operating means being adjustable to vary the amount of such further closing movements of the wipers.

11. In a lasting machine, end-lasting wipers formed to extend around an end of a shoe, devices associated respectively with the different wipers for guiding them in such paths that they move both lengthwise and laterally of the shoe during a portion of the wiping operation and thereafter continue their movements laterally of the shoe without any substantial further movement lengthwise of the shoe, and operating mechanisms arranged respectively to impart to the different wipers their operative movements and adjustable to vary the distances through which the wipers are moved laterally of the shoe after their movement lengthwise of the shoe has substantially ceased.

12. In a lasting machine, end-lasting wipers formed to extend around an end of a shoe, devices associated respectively with the different wipers for guiding them in such paths that they move both lengthwise and laterally of the shoe during a portion of the wiping operation and thereafter continue their movements laterally of the shoe without any substantial further movement lengthwise of the shoe, links arranged respectively to impart to the different wipers their operative movements, and levers for operating said links, the effective lengths of said levers being variable to vary the distances through which the wipers are moved laterally of the shoe after their movement lengthwise of the shoe has substantially ceased.

13. In a lasting machine, end-lasting wipers for operating on an upper around an end of a shoe, and operating means for moving said wipers positively inward over the shoe bottom, said operating means comprising parts connected respectively to the different wipers and separately adjustable to vary the distances through which the wipers are moved in their operation.

14. In a lasting machine, end-lasting wipers for operating on an upper around an end of a shoe, and operating means for moving said wipers inwardly over the shoe bottom, said operating means comprising links connected respectively to the different wipers and levers connected to said links and of variable effective lengths to vary the distances through which the wipers are moved in their operation.

15. In a lasting machine, end-lasting wipers formed to extend around an end of a shoe, and operating means for imparting to said wipers advancing movement lengthwise of the shoe and closing movements laterally of the shoe during a portion of the wiping operation and for thereafter imparting to them further closing movements through distances variably predetermined in accordance with the size of the shoe without any substantial further advancing movement, the wipers being preliminarily adjustable toward or from each other in accordance with the size of the shoe.

16. In a lasting machine, end-lasting wipers formed to extend around an end of a shoe, wiper carriers connected to said wipers for operating them, guiding devices associated respectively with the different wiper carriers for guiding them in such paths that the wipers receive simultaneous advancing movement lengthwise of the shoe and closing movements laterally of the shoe during a portion of the wiping operation and thereafter receive further closing movements without any substantial further advancing movement, and operating means for imparting to the wiper carriers their operative movements, said operating means being adjustable to vary the amount of the further closing movements of the wipers after their advancing movement has substantially ceased and the wipers also being preliminarily adjustable toward or from each other relatively to the wiper carriers.

17. In a lasting machine, end-lasting wipers for operating on an upper around an end of a shoe, and automatic operating means for moving said wipers inwardly over the shoe bottom, said operating means being adjustable to vary the distances through which the wipers are moved in their operation and the wipers also being preliminarily adjustable, each independently of the other, to vary their positions for operating on shoes of different sizes.

18. In a lasting machine, end-lasting wipers for operating on an upper around an end of a shoe, wiper carriers connected to said wipers for operating them, and automatic mechanism for imparting operative movements to said wiper carriers, said mechanism being adjustable to vary the distances through which the wipers are moved and the wipers also being adjustable relatively to the wiper carriers to vary their positions for operating on shoes of different sizes.

19. In a heel-end lasting machine, the combination with wipers for wiping the margin of an upper about the heel end of a shoe on a last into lasted position, of means for positioning the shoe and last for the operation of said wipers, said positioning means comprising a plurality of members arranged to engage the bottom of the heel end of the shoe in different locations, said members being adjustable as a unit heightwise of the shoe and also relatively adjustable heightwise of the shoe.

20. In a heel-end lasting machine, the combination with wipers for wiping the margin of an upper about the heel end of a shoe on a last into lasted position, of means for positioning the shoe and last for the operation of said wipers, said positioning means comprising a holddown for engaging the bottom of the heel end of the shoe, and an auxiliary positioning device arranged to engage the bottom of the shoe at or near its heel end forwardly of said holddown and adjustable relatively to the holddown.

21. In a heel-end lasting machine, the combination with wipers for wiping the margin of an upper about the heel end of a shoe on a last into lasted position, of means for positioning the shoe and last for the operation of said wipers, said positioning means comprising a holddown for engaging the bottom of the heel end of the shoe, and an auxiliary positioning device arranged to engage the bottom of the shoe at or near its heel end forwardly of said holddown, said device being adjustable both heightwise and lengthwise of the shoe relatively to the holddown.

22. In a heel-end lasting machine, the combination with wipers for wiping the margin of an upper about the heel end of a shoe on a last into lasted position, of means for positioning the shoe and last for the operation of said wipers, said positioning means comprising a holddown for engaging the bottom of the heel end of the shoe, an auxiliary positioning member arranged to engage the bottom of the shoe forwardly of said holddown, a support for said member mounted for swinging movements lengthwise of the shoe and relatively to which the member is adjustable heightwise of the shoe, a spring tending to swing said support rearwardly, and means cooperating with said spring to determine variably the position of the support.

23. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, an operating member supporting said holddown and movable in a direction heightwise of the shoe in the operation of the machine, and an auxiliary positioning device also supported by said member and arranged to engage the bottom of the shoe forwardly of said holddown, said device being adjustable heightwise of the shoe relatively to the holddown.

24. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, an operating member supporting said holddown and movable in a direction heightwise of the shoe in the operation of the machine, an auxiliary positioning device also supported by said member and arranged to engage the bottom of the shoe forwardly of the holddown, said device being mounted for movement lengthwise of the shoe relatively to the holddown, and means for adjustably varying the distance between said device and the holddown.

25. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe farther inwardly from the edge of the heel seat than the margin of the upper extends in lasted position, and an auxiliary positioning device arranged to engage the margin of the upper on the shoe bottom to assist in determining the position of the shoe and last.

26. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and an auxiliary positioning device arranged to engage the margin of the upper on the shoe bottom at the opposite sides thereof forwardly of but near the heel breast line to assist in determining the position of the shoe and last.

27. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe farther inwardly from the edge of the heel seat than the margin of the upper extends in lasted position, and members arranged to engage the margin of the upper on the shoe bottom at the opposite sides of the shank portion to assist in determining the position of the shoe and last.

28. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and members arranged to engage the shank portion of the bottom of the shoe at the opposite sides thereof to assist in determining the position of the shoe and last, said members being adjustable relatively to the holddown.

29. In a heel-end lasting machine, the combination with wipers for wiping the margin of an upper about the heel end of a shoe on a last into lasted position, of means for positioning the shoe and last for the operation of said wipers, said positioning means comprising different members arranged to engage the bottom of the heel end of the shoe in different locations to determine the relation of the shoe and last to the plane of the wipers, one of said members being movable inwardly over the heel seat in the wiping operation.

30. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and an auxiliary positioning member arranged to engage the margin of the upper on the shoe bottom at the rear end of the shoe to assist in determining the position of the shoe and last and movable inwardly over the shoe bottom by the action of the wipers thereon.

31. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and an auxiliary positioning member supported by said holddown and arranged to engage the margin of the upper on the shoe bottom at the rear end of the shoe to assist in determining the position of the shoe and last, said member being movable lengthwise of the shoe relatively to the holddown in response to the action of the wipers thereon in the wiping operation.

32. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and an auxiliary positioning member arranged to engage the bottom of the shoe at the rear of said holddown to assist in determining the position of the shoe and last, said member being guided by the holddown for forward movement in response to the action of the wipers thereon in the wiping operation, and a spring for imparting return movement to the member.

33. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and an auxiliary positioning member arranged to engage the bottom of the shoe at the rear of said holddown to assist in determining the position of the shoe and last, said member being guided by the holddown for forward movement in the wiping operation and also mounted for swinging movements heightwise of the shoe relatively to the holddown.

34. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, an auxiliary positioning member supported by said holddown for engaging the margin of the upper on the shoe bottom at the rear end of the heel seat, means for moving the holddown heightwise of the shoe at a predetermined time in the operation of the machine to permit the shoe to be pressed more firmly against the wipers, and means for maintaining the shoe-engaging portion of said member in substantially the same position notwithstanding the movement of the holddown.

35. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, an auxiliary positioning member supported by said holddown for engaging the margin of the upper on the shoe bottom at the rear end of the heel seat, said member being mounted for swinging movements heightwise of the shoe relatively to the holddown, means for moving the holddown heightwise of the shoe at a predetermined time in the operation of the machine to permit the shoe to be pressed more firmly against the wipers, and mechanism controlled by the holddown for maintaining the shoe-engaging portion of said member in substantially the same position notwithstanding the movement of the holddown.

36. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and a member arranged to engage the margin of the upper on the shoe bottom at the rear end of the heel seat to assist in determining the position of the shoe and last.

37. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and a member supported by said holddown and arranged to engage the margin of the upper on the shoe bottom at the rear end of the heel seat to assist in determining the position of the shoe and last, said member being adjustable heightwise of the shoe relatively to the holddown.

38. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, a member arranged to engage the margin of the upper on the shoe bottom at the rear end of the heel seat to assist in determining the position of the shoe and last, said member being supported by the holddown for swinging movements heightwise of the shoe, and means for adjusting the member about its axis on the holddown.

39. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and a member arranged to engage the margin of the upper on the shoe bottom at the rear end of the heel seat to assist in determining the position of the shoe and last, said member being supported independently of the holddown.

40. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and a member arranged to engage the margin of the upper on the shoe bottom at the rear end of the heel seat to assist in determining the position of the shoe and last, said member being mounted for limited movement heightwise of the shoe in response to pressure of the shoe against it.

41. In a heel-end lasting machine, the combination with wipers for wiping the margin of an upper about the heel end of a shoe on a last into lasted position, of means for positioning the shoe and last for the operation of said wipers, said positioning means comprising a member arranged to engage the margin of the upper on the shoe bottom at the rear end of the heel seat and mounted for limited movement heightwise of the shoe in response to pressure of the shoe thereon.

42. In a heel-end lasting machine, the combination with wipers for wiping the margin of an upper about the heel end of a shoe on a last into lasted position, of means for positioning the shoe and last for the operation of said wipers, said positioning means comprising a member arranged to extend forwardly between the wipers for engaging the margin of the upper on the shoe bottom at the rear end of the heel seat, said member being mounted for movement heightwise of the shoe in response to pressure of the shoe against it, and means for adjustably limiting such movement of the member.

43. In a heel-end lasting machine, the combination with wipers for wiping the margin of an upper about the heel end of a shoe on a last into lasted position, of means for positioning the shoe and last for the operation of said wipers, said positioning means comprising members arranged to engage the margin of the upper on the shoe bottom in different locations along the edge of the shoe bottom.

44. In a heel-end lasting machine, the combination with wipers for wiping the margin of an upper about the heel end of a shoe on a last into lasted position, of means for positioning the shoe and last for the operation of said wipers, said positioning means comprising a member arranged to engage the margin of the upper on the shoe bottom at the rear end of the heel seat and other members arranged similarly to engage the margin of the upper farther forwardly along the shoe bottom.

45. In a heel-end lasting machine, the combination with wipers for wiping the margin of an upper about the heel end of a shoe on a last into lasted position, of means for positioning the shoe and last for the operation of said wipers, said positioning means comprising a member arranged to engage the margin of the upper on the shoe bottom at the rear end of the heel seat and other members arranged similarly to engage the margin of the upper at the opposite sides of the shoe bottom in locations forwardly of but near the heel seat.

46. In a heel-end-lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe farther inwardly from the edge of the shoe bottom than the margin of the upper extends in lasted position, and members arranged to engage the margin of the upper on the shoe bottom in locations forwardly and rearwardly of said holddown to assist in positioning the shoe last.

47. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, and members arranged to act on the shoe bottom, one at the rear of said holddown and others forwardly of the holddown at opposite sides of the shoe bottom, to assist in determining the position of the shoe and last.

48. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, a lever pivotally connected to said holddown for moving it heightwise of the shoe, and means for guiding the holddown in its movements.

49. In a heel-end lasting machine, the combination with wipers for wiping the margin of an upper about the heel end of a shoe on a last into lasted position, of means for positioning the shoe and last for the operation of said wipers, said positioning means comprising a holddown arranged to engage the bottom of the heel end of the shoe, a lever pivotally connected to said holddown for moving it heightwise of the shoe, and pin-and-slot guiding means arranged to control the holddown in its movements and to permit its removal when disconnected from its operating lever.

50. In a heel-end lasting machine, the combination with a shoe support, and wipers for lasting the heel end of a shoe on said support, of members arranged to engage the bottom of the shoe in different locations at the rear of the forepart to determine the position of the shoe with respect to tipping movements, a heel band for clamping the shoe about its heel end, and members for clamping the shoe at its opposite sides forwardly of but near said heel band to assist in supporting and holding it against tipping movements.

51. In a heel-end lasting machine, the combination with a shoe support, and wipers for lasting the heel end of a shoe on said support, of members arranged to engage the bottom of the shoe in different locations at the rear of the forepart to determine the position of the shoe with respect to tipping movements, a heel band for clamping the shoe about its heel end, and members for clamping the shoe at its opposite sides forwardly of but near said heel band to assist in supporting and holding it against tipping movements, said clamping members being arranged to engage the shoe in locations spaced substantial distances from the shoe bottom where the sides of the shoe curve inwardly toward its top portion.

52. In a heel-end lasting machine, the combination with a shoe support, and wipers for lasting the heel end of a shoe on said support, of members arranged to engage the bottom of the heel end of the shoe in different locations to determine the position of the shoe with respect to tipping movements, a heel band for clamping the shoe about its heel end, and members mounted for swinging movements about axes extending heightwise of the shoe into clamping relation to the shoe forwardly of but near said heel band to assist in supporting and holding it against tipping movements.

53. In a heel-end lasting machine, the combination with a shoe support including a spindle for engaging the heel end of a last in its spindle hole, and wipers for lasting the heel end of a shoe on said support, of members for engaging the bottom of the shoe in different locations at the rear of the forepart to determine its position with respect to tipping movements, means for clamping the heel end of the shoe laterally, and additional clamping means comprising members arranged to clamp the sides of the shoe in locations substantially at the rear end of the waist portion of the shoe to assist in supporting and holding it against tipping movements, said last-named members being arranged to engage the shoe in locations spaced substantial distances from the shoe bottom where the sides of the shoe curve inwardly toward its top portion.

54. In a heel-end lasting machine, the combination with a shoe support, and wipers for lasting the heel end of a shoe on said support, of members for engaging the bottom of the shoe in different locations at the rear of the forepart to determine the position of the shoe with respect to tipping movements, and members arranged to clamp the opposite sides of the shoe in locations forwardly of but near its heel-end portion to assist in supporting and holding it against tipping movements, said last-named members being mounted independently of the shoe support for movement into and out of clamping positions.

55. In a heel-end lasting machine, the combination with a shoe support, and wipers for lasting the heel end of a shoe on said support, of members for clamping the opposite sides of the shoe in locations forwardly of but near its heel end portion to assist in supporting and holding it against tipping movements, said members being mounted independently of the shoe support for movements into and out of clamping positions and being arranged to engage the shoe in locations spaced substantial distances from the shoe bottom where the sides of the shoe curve inwardly toward its top portion.

56. In a heel-end lasting machine, the combination with a shoe support, and wipers for lasting the heel end of a shoe on said support, of a heel band for clamping the shoe about its heel end, and members for clamping the shoe at its opposite sides between the heel band and the forepart of the shoe to assist in supporting and holding it against tipping movements, said members being mounted independently of the shoe support for swinging movements about axes extending heightwise of the shoe into and out of clamping positions and being arranged to engage the shoe in locations spaced substantial distances from the shoe bottom where the sides of the shoe curve inwardly toward its top portion.

57. In a heel-end lasting machine, the combination with a shoe support and heel-end lasting means, of members for clamping the opposite sides of a shoe on said support at the rear of the forepart to assist in supporting and holding the shoe in the lasting operation, said members being movable laterally of the shoe into clamping positions, and connections between said members including an equalizing device mounted for swinging movement and arranged to permit both members to adjust themselves to the shoe regardless of the shape or lateral position of the shoe.

58. In a heel-end lasting machine, the combination with a shoe support, and wipers for lasting the heel end of a shoe on said support, of a heel band for clamping the shoe about its heel end, members arranged to clamp the shoe at its opposite sides forwardly of but near said heel band to assist in controlling it in the lasting operation, said members being mounted for swinging movements laterally of the shoe, and connections between said members including an equalizing device mounted for swinging movement to permit both members to adjust themselves to the shoe regardless of the shape or lateral position of the shoe.

59. In a heel-end lasting machine, the combination with a shoe support and heel-end lasting means, of members for clamping the opposite sides of a shoe on said support at the rear of the forepart to assist in controlling it in the lasting operation, arms supporting said members and mounted for swinging movements laterally of the shoe, and mechanism for swinging said arms including an equalizing lever arranged to permit relative movements of the arms to adjust the members to the shoe regardless of the shape or position of the shoe.

60. In a heel-end lasting machine, the combination with a shoe support and heel-end lasting means, of members for clamping the opposite sides of a shoe on said support at the rear of the forepart to assist in controlling it in the lasting operation, bell-crank levers supporting said members and mounted for swinging movements about axes extending heightwise of the shoe, an equalizing lever, links connecting said equalizing lever to the bell-crank levers, and means arranged to act through said equalizing lever to swing the members into clamping positions.

61. In a heel-end lasting machine, the combination with a shoe support and heel-end lasting means, of members for clamping the opposite sides of a shoe on said support to assist in controlling it in the lasting operation, bell-crank levers supporting said members and mounted for swinging movements about axes extending heightwise of the shoe, an equalizing member mounted for swinging movements about an axis also extending heightwise of the shoe, links connecting said equalizing member to the bell-crank levers, and a lever supporting said equalizing member and movable to swing the clamp members into clamping positions.

62. In a heel-end lasting machine, the combination with a shoe support and heel-end lasting means, of members for clamping the opposite sides of a shoe on said support, bell-crank levers supporting said members and mounted for swinging movements about axes extending heightwise of the shoe, an operating lever mounted to swing about an axis also extending heightwise of the shoe, and mechanism comprising links for connecting said operating lever to the bell-crank levers for swinging the clamp members into clamping positions.

63. In a heel-end lasting machine, the combination with a shoe support and heel-end lasting means, of members for clamping the opposite sides of a shoe on said support at the rear of the forepart, levers supporting said members and mounted for swinging movements laterally of the shoe, connections between said levers including an equalizing member mounted for swinging movements to permit the members to adjust themselves to the shoe regardless of the shape or position of the shoe, and yieldable means arranged to control said equalizing member to determine the initial positions of the clamp members.

64. In a heel-end lasting machine, the combination with a shoe support and heel-end lasting means, of members for clamping the opposite sides of a shoe on said support at the rear of the forepart, bell-crank levers supporting said members and mounted for swinging movements laterally of the shoe about axes extending heightwise of the shoe, an equalizing member mounted for swinging movements and connected to said bell-crank levers to permit the clamp members to adjust themselves to the shoe regardless of the shape or position of the shoe, and a spring-controlled member arranged to act on said equalizing member to determine the initial positions of the clamp members.

65. In a power-operated heel-end lasting machine, the combination with heel-lasting wipers movable in an automatically determined cycle of operations of the machine to wipe the margin of the heel end of the upper of a shoe into lasted position, of automatic means for controlling the shoe comprising a cam-operated lever having a member thereon through which the lever is operated by its cam, and mechanism for effecting displacement of said member relatively to the portion of the lever on which it is mounted to decrease the resistance of the shoe to the operative movement of the wipers in the event of abnormal resistance to such movement.

66. In a power-operated heel-end lasting machine, the combination with heel-lasting wipers movable in an automatically determined cycle of operations of the machine to wipe the margin of the heel end of the upper of a shoe into lasted position, of automatic means for controlling the shoe comprising a cam-operated member having a roll thereon through which the member is operated by its cam, a rotatable eccentric supporting the roll on said member, and means for turning said eccentric to effect a displacement of the roll relatively to the member and thereby to decrease the resistance of the shoe to the operative movement of the wipers in the event of abnormal resistance to such movement.

67. In a power-operated heel-end lasting machine, the combination with heel-lasting wipers movable in an automatically determined cycle of operations of the machine to wipe the margin of the heel end of the upper of a shoe into lasted position, of automatic means for controlling the shoe comprising a cam-operated lever having a roll thereon through which the lever is operated by its cam, said roll being displaceable relatively to the lever, and a toggle arranged to control the roll and movable to effect its displacement and thereby to decrease the resistance of the shoe to the operative movement of the wipers in the event of abnormal resistance to such movement.

68. In a power-operated heel-end lasting machine, the combination with heel-lasting wipers movable in an automatically determined cycle of operations of the machine to wipe the margin of the heel end of the upper of a shoe into lasted position, of automatic means for controlling the shoe comprising a cam-operated lever having a roll thereon through which the lever is operated by its cam, a rotatable eccentric supporting said roll on the lever, a toggle arranged to control said eccentric, a spring arranged to act on said toggle to maintain the roll in a normal relation to the lever, and means whereby the toggle may be operated to displace the roll from its normal position and thereby to decrease the resistance of the shoe to the operative movement of the wipers in the event of abnormal resistance to such movement.

69. In a machine for operating on shoes, the combination with power-driven means for operating on a shoe, of automatic means for clamping and holding the shoe in the normal operation of the machine comprising a cam-operated member having a roll thereon through which the member is operated by its cam, said roll being displaceable at the will of the operator relatively to the portion of the member on which it is mounted after the starting of the machine to decrease the resistance of the shoe to the movement of the means that operates thereon if the resistance is such as to prevent the completion of that movement.

70. In a machine for operating on shoes, the combination with power-driven means for operating on a shoe, of automatic means for clamping and holding the shoe in the normal operation of the machine comprising a cam-operated member having a roll thereon through which the member is operated by its cam, an eccentric supporting the roll on said member, and means to enable the operator to turn said eccentric and thereby to displace the roll relatively to said member after the starting of the machine to decrease the resistance of the shoe to the movement of the means that operates thereon if the resistance is such as to prevent the completion of that movement.

71. In a machine for operating on shoes, the combination with power-driven means for operating on a shoe, of automatic means for clamping and holding the shoe in the normal operation of the machine comprising a cam-operated lever having a roll thereon through which the lever is operated by its cam, an eccentric supporting the roll on said lever, and a toggle controlling said eccentric and movable by the operator to displace the roll relatively to the lever after the starting of the machine and thereby to decrease the resistance of the shoe to the movement of the means that operates thereon if the resistance is such as to prevent the completion of that movement.

72. In a heel-end lasting machine, the combination with heel-lasting wipers, of a heel band for embracing and clamping the heel end of a shoe for the operation of said wipers, and means for supporting and controlling said heel band, said means comprising, at each of the opposite end portions of the band, a member secured to the band, another member supporting said first-named member, and a connection between said members to render said other member effective both to close and to open the band while permitting relative sliding movement of the two members lengthwise of the shoe as the band is closed or opened.

73. In a heel-end lasting machine, the combination with heel-lasting wipers, of a heel band for embracing and clamping the heel end of a shoe for the operation of said wipers, and means for supporting and controlling said heel band, said means comprising, at each of the opposite end portions of the band, a member secured to the band, another member supporting said first-named member, and a pin-and-slot connection between said members to render said other member effective both to close and to open the band while permitting relative movement of the two members lengthwise of the shoe as the band is closed or opened.

74. In a heel-end lasting machine, the combination with heel-lasting wipers, of a heel band for embracing and clamping the heel end of a shoe for the operation of said wipers, and means for supporting and controlling said heel band, said means comprising, at each of the opposite end portions of the band, a member secured to the band and having thereon an upper flange and also a lower flange provided with a slot extending lengthwise of the shoe, and another member projecting between said flanges to support the band by the upper flange and having a pin projecting into the slot in the lower flange.

75. In a lasting machine, the combination with lasting means comprising mechanism for driving upper-fastening tacks to fasten an upper in lasted position, of different rotatable devices comprising tack pots for supplying tacks of different lengths to said tack-driving mechanism, and a member for operating said devices, said member being movable at the will of the operator into position to operate either of said devices alternatively.

76. In a lasting machine, the combination with lasting means comprising mechanism for driving upper-fastening tacks to fasten an upper in lasted position, of different rotatable devices for supplying tacks of different lengths to said tack-driving mechanism, and a rack bar for operating said devices, said rack bar being mounted for movements to position it in operative relation to either of said devices alternatively.

77. In a lasting machine, the combination with lasting means comprising mechanism for driving upper-fastening tacks to fasten an upper in lasted position, of different rotatable devices for supplying tacks of different lengths to said tack-driving mechanism, a rack bar for operating said devices, a holder for said rack bar mounted for swinging movements to position the bar in operative relation to either of said devices alternatively, and manually-operated cam means for swinging said holder.

78. In a heel-end lasting machine, the combination with heel-end lasting means, and a shoe support comprising a spindle for engaging the heel end of a last in its spindle hole to present the last and shoe in position for the lasting operation, of a member arranged at one side of said shoe support to serve as a rest for the forepart of the shoe when the latter is turned about the heel spindle before it is presented in position for the lasting operation.

79. In a heel-end lasting machine, the combination with heel-end lasting means, and a shoe support comprising a spindle for engaging the heel end of a last in its spindle hole to present the last and shoe in position for the lasting operation, of members arranged at opposite sides of said shoe support to serve as rests for the forepart of the shoe when the latter is turned about the heel spindle to different positions before it is presented in position for the lasting operation.

JOSEPH GOULDBOURN.
FRED RICKS.
WILLIAM THOMAS
    BUCKINGHAM ROBERTS.